United States Patent
Yokoyama et al.

(10) Patent No.: US 12,269,419 B2
(45) Date of Patent: Apr. 8, 2025

(54) SEAT BELT RETRACTOR

(71) Applicant: ASHIMORI INDUSTRY CO., LTD., Settsu (JP)

(72) Inventors: Taro Yokoyama, Settsu (JP); Satoshi Suminaka, Settsu (JP); Takayoshi Ijiri, Settsu (JP); Noriko Kurauchi, Settsu (JP); Eri Fujiwara, Settsu (JP); Daiki Hijikata, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 0 days.

(21) Appl. No.: 18/600,253

(22) Filed: Mar. 8, 2024

(65) Prior Publication Data

US 2024/0359655 A1   Oct. 31, 2024

(30) Foreign Application Priority Data

Apr. 27, 2023 (JP) .................................. 2023-073131
Feb. 28, 2024 (JP) .................................. 2024-028050

(51) Int. Cl.
  *B60R 22/46*   (2006.01)
  *B60R 22/343*  (2006.01)
  *B60R 22/28*   (2006.01)

(52) U.S. Cl.
  CPC ........ *B60R 22/4676* (2013.01); *B60R 22/343* (2013.01); *B60R 2022/287* (2013.01); *B60R 22/4628* (2013.01)

(58) Field of Classification Search
  CPC .................... B60R 2022/287; B60R 22/4676
  See application file for complete search history.

(56) References Cited

U.S. PATENT DOCUMENTS

| | | | |
|---|---|---|---|
| 8,387,907 B2 * | 3/2013 | Ono | B60R 22/4676 |
| | | | 242/379 |
| 9,212,024 B2 * | 12/2015 | Maekubo | B65H 75/48 |
| 2008/0290204 A1 * | 11/2008 | Verhoven | B60R 22/4633 |
| | | | 242/374 |
| 2011/0031340 A1 * | 2/2011 | Maekubo | B60R 22/3413 |
| | | | 242/379.1 |

(Continued)

FOREIGN PATENT DOCUMENTS

| | | | |
|---|---|---|---|
| JP | 2020-104777 A | 7/2020 | |
| WO | WO-2012117610 A1 * | 9/2012 | ........... B60R 22/341 |

(Continued)

*Primary Examiner* — Nicole T Verley
(74) *Attorney, Agent, or Firm* — Sughrue Mion, PLLC

(57) ABSTRACT

A seat belt retractor includes a housing including a pair of side walls facing each other, a winding drum configured to wind up a webbing, a locking base being prevented from being rotated in the pull-out direction, in an emergency of a vehicle, an impact energy absorbing member connecting the winding drum and the locking base so as to be integrally rotatable in a normal state, an impact energy absorbing wire housed in a slot provided in the winding drum so as to form an opening in the first end surface of the winding drum, a ring provided integrally with or separately from the locking base, and a stopper member being configured to define an allowable amount of relative rotation between the winding drum and the locking base in a case where the impact energy absorbing member absorbs the impact energy.

11 Claims, 23 Drawing Sheets

(56) References Cited

U.S. PATENT DOCUMENTS

| | | | |
|---|---|---|---|
| 2015/0224959 A1* | 8/2015 | Suminaka | B60R 22/4633 242/383.4 |
| 2018/0118156 A1* | 5/2018 | Suga | B60R 22/3413 |
| 2023/0219520 A1* | 7/2023 | Yokoi | B60R 22/4676 242/396.1 |

FOREIGN PATENT DOCUMENTS

| | | | | |
|---|---|---|---|---|
| WO | WO-2013179978 A1 | * | 12/2013 | B60R 22/4633 |
| WO | WO-2013179979 A1 | * | 12/2013 | B60R 22/3413 |
| WO | WO-2014163073 A1 | * | 10/2014 | B60R 22/3413 |

* cited by examiner

FIG. 4
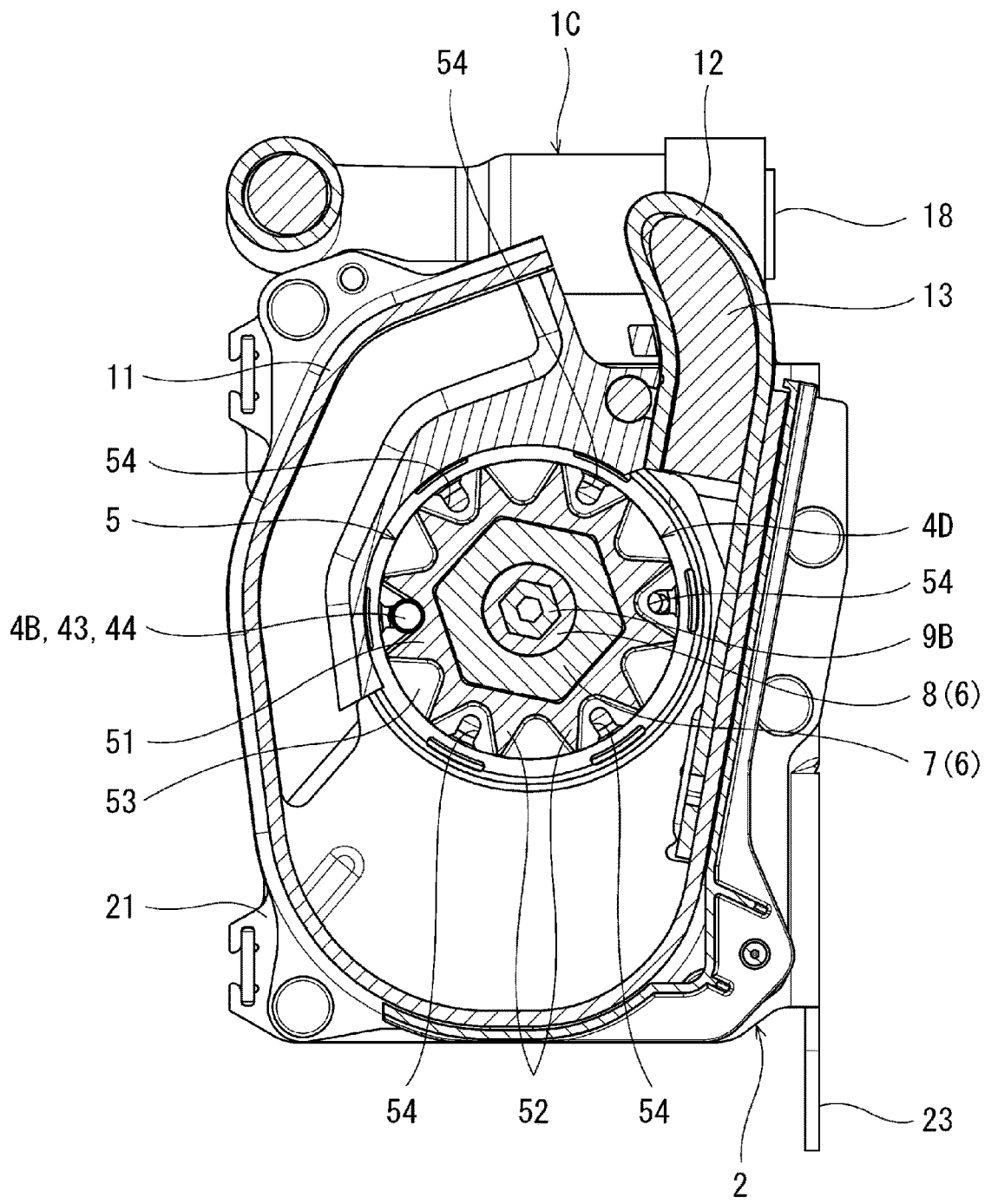
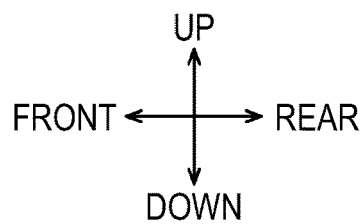

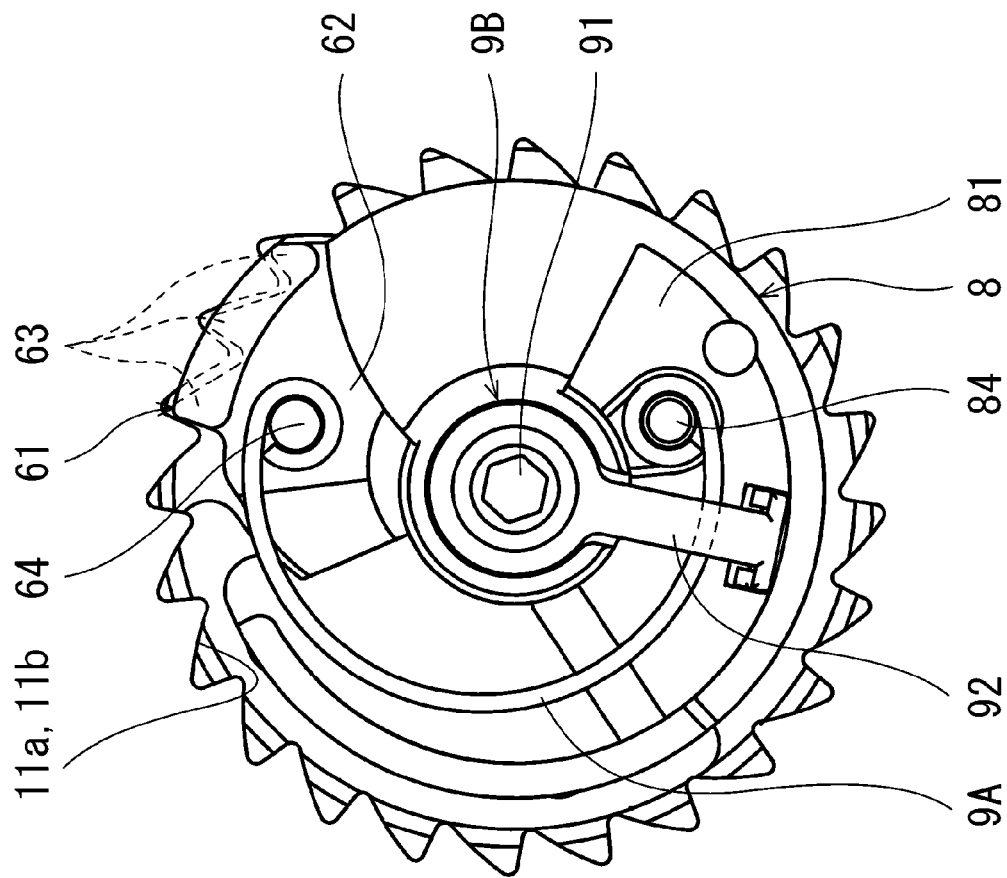

RIGHT ⟷ LEFT

RIGHT ←→ LEFT

RIGHT ←→ LEFT

RIGHT ← → LEFT

SEAT BELT RETRACTOR

CROSS-REFERENCE TO RELATED APPLICATIONS

This application is based on and claims priority under 35 USC 119 from Japanese Patent Application No. 2023-073131 filed on Apr. 27, 2023 and Japanese Patent Application No. 2024-028050 filed on Feb. 28, 2024, the entire content of which is incorporated herein by reference.

TECHNICAL FIELD

The present disclosure relates to a seat belt retractor capable of absorbing impact energy of an occupant while a webbing is pulled out, and capable of restricting a pull-out amount of the webbing in an emergency such as vehicle collision.

BACKGROUND ART

In the related art, there is a seat belt retractor configured to prevent a webbing from being pulled out in an emergency of a vehicle. In the seat belt retractor, a winding drum configured to wind up the webbing is rotatably housed between a pair of side walls of a housing.

For example, JP2020-104777A discloses a seat belt retractor 100 illustrated in FIG. 22. In the seat belt retractor 100, a torsion bar 130, which is an impact energy absorbing member, and an impact energy absorbing wire (referred to as an "energy absorbing pin" in JP2020-104777A) 140 are used.

Specifically, in the seat belt retractor 100, a winding drum (referred to as a "spool" in JP2020-104777A) 110 has a center hole 112 opened to one end surface 111, and a locking base 120 is disposed to face the end surface 111. The torsion bar 130 is inserted into the center hole 112 of the winding drum 110, and includes one end side, opposite to the locking base 120, coupled to the winding drum 110 without being rotatable relative to the winding drum 110, and the other end side coupled to the locking base 120 without being rotatable relative to the locking base 120.

The locking base 120 is prevented from being rotated in a pull-out direction in an emergency of a vehicle. As a result, the winding drum 110 is rotated relative to the locking base 120 while a webbing 200 is pulled out. The torsion bar 130 is configured to absorb impact energy by plastic deformation caused by twisting in that time.

Further, the winding drum 110 includes a slot (referred to as an "axial direction hole" in JP2020-104777A) 113 so as to form an opening in the end surface 111 facing the locking base 120, and the impact energy absorbing wire 140 is housed in the slot 113 in a state where a head portion protrudes. The head portion of the impact energy absorbing wire 140 is attached to the locking base 120, and the impact energy absorbing wire 140 is configured to be pulled out from the opening of the slot 113 while being plastically deformed in the emergency of the vehicle, so as to absorb impact energy.

An arc-shaped guide groove 121 that is concentric with the locking base 120 is provided on a surface of the locking base 120 facing the winding drum 110. The impact energy absorbing wire 140 is pulled out from the opening of the slot 113 while being plastically deformed, and then wound around a radially inner side wall surface of the guide groove 121.

The seat belt retractor 100 includes a stopper member 150 that defines an allowable amount of the relative rotation between the winding drum 110 and the locking base 120 when the torsion bar 130 absorbs the impact energy.

The stopper member 150 is held in the center hole 112 of the winding drum 110 without being rotatable relative to the winding drum 110 and so as to be movable in an axial direction of the winding drum 110. The locking base 120 includes a shaft portion 122 coaxial with the winding drum 110, a male screw is formed on an outer circumferential surface of the shaft portion 122, and the stopper member 150 is screwed onto the male screw. In the emergency of the vehicle, the relative rotation between the winding drum 110 and the locking base 120 is restricted to a predetermined amount by the stopper member 150. Accordingly, a pull-out amount of the webbing 200 is restricted, and an occupant is prevented from moving in a forward direction beyond a predetermined distance.

In a case where the impact energy absorbing wire 140 pulled out from the opening of the slot 113 of the winding drum 110 is wound around a part of the locking base 120 as in the seat belt retractor 100 of JP2020-104777A, the impact energy absorbing wire 140 can absorb the impact energy stably. For example, instead of the guide groove 121 of the locking base 120, in a case where the winding drum 110 includes a winding portion around which the impact energy absorbing wire 140 pulled out from the opening of the slot 113 is wound, the impact energy absorbing wire 140 after the plastic deformation slides on the winding portion, and thus a webbing pull-out load at the time of absorbing the impact energy becomes unstable due to the influence of friction caused by the sliding.

However, in the seat belt retractor 100 of JP2020-104777A, the guide groove 121 of the locking base 120 is located at a position separated from the stopper member 150 in the axial direction of the winding drum 110, and thus a dimension of the seat belt retractor 100 in the axial direction of the winding drum 110 is increased.

SUMMARY OF INVENTION

Aspect of non-limiting embodiments of the present disclosure relates to provide a seat belt retractor which includes a stopper member, can absorb impact energy stably by an impact energy absorbing wire, and can be reduced in size in an axial direction of a winding drum.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a seat belt retractor including:
  a housing including a pair of side walls facing each other;
  a winding drum configured to wind up a webbing, the winding drum being housed between the pair of side walls so as to be rotatable in a winding direction and a pull-out direction of the webbing, the winding drum having a center hole opened at least in a first end surface;
  a locking base disposed to face the first end surface of the winding drum, the locking base being prevented from being rotated in the pull-out direction, in an emergency of a vehicle, a male screw being formed on an outer circumferential surface of a shaft portion, of the locking base, coaxial with the winding drum;

an impact energy absorbing member including one end side coupled to the winding drum and the other end side coupled to the locking base, the impact energy absorbing member connecting the winding drum and the locking base so as to be integrally rotatable in a normal state, and the impact energy absorbing member being configured to be plastically deformed in a case where a pull-out force of the webbing exceeds a predetermined value in a state where the locking base is prevented from being rotated in the pull-out direction, so as to absorb impact energy while allowing relative rotation between the winding drum and the locking base;

an impact energy absorbing wire housed in a slot provided in the winding drum so as to form an opening in the first end surface of the winding drum, a head portion of the impact energy absorbing wire that protrudes from the opening of the slot being attached to the locking base, the impact energy absorbing wire being configured to be pulled out from the opening while being plastically deformed in a case where the winding drum and the locking base are relatively rotated, so as to absorb the impact energy;

a ring provided integrally with or separately from the locking base, the ring being configured to be coaxially rotatable relative to the winding drum, the impact energy absorbing wire pulled out from the opening being wound around an outer circumference of the ring; and a stopper member being held in the center hole without being rotatable relative to the winding drum and so as to be movable in an axial direction of the winding drum, the stopper member being screwed onto the male screw of the locking base, and the stopper member being configured to define an allowable amount of relative rotation between the winding drum and the locking base in a case where the impact energy absorbing member absorbs the impact energy, in which the stopper member is configured to be movable while being located radially inside the ring.

BRIEF DESCRIPTION OF DRAWINGS

Exemplary embodiment(s) of the present invention will be described in detail based on the following figures, wherein:

FIG. 4 is a cross-sectional view taken along a line IV-IV in FIG. 3;

FIG. 13B illustrates a state of the return spring when the lock member is located at an engagement position;

DESCRIPTION OF EMBODIMENTS

Figure 1:
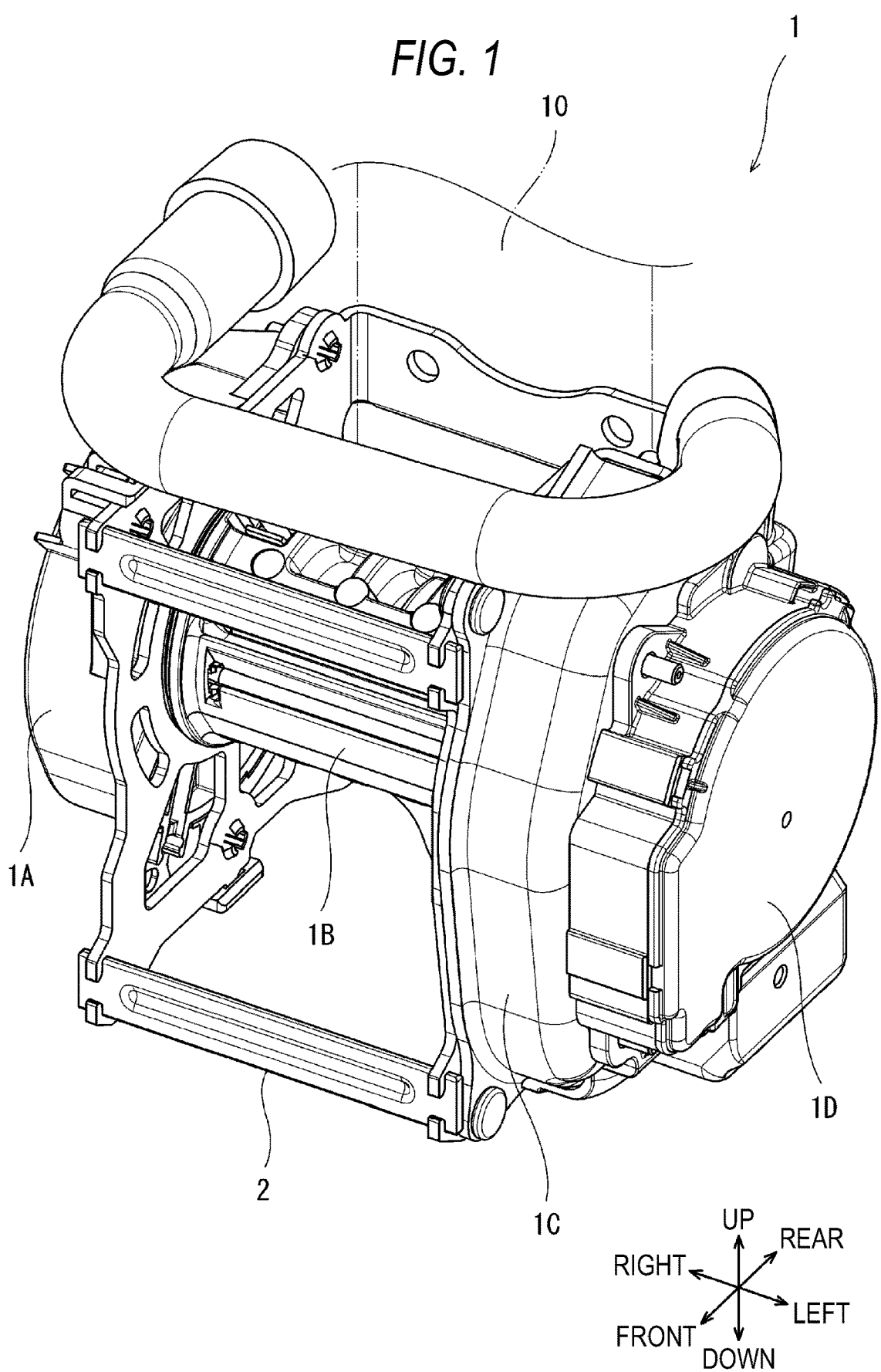
FIG. 1 is a perspective view of a seat belt retractor according to an embodiment of the present disclosure.
Figure 2:
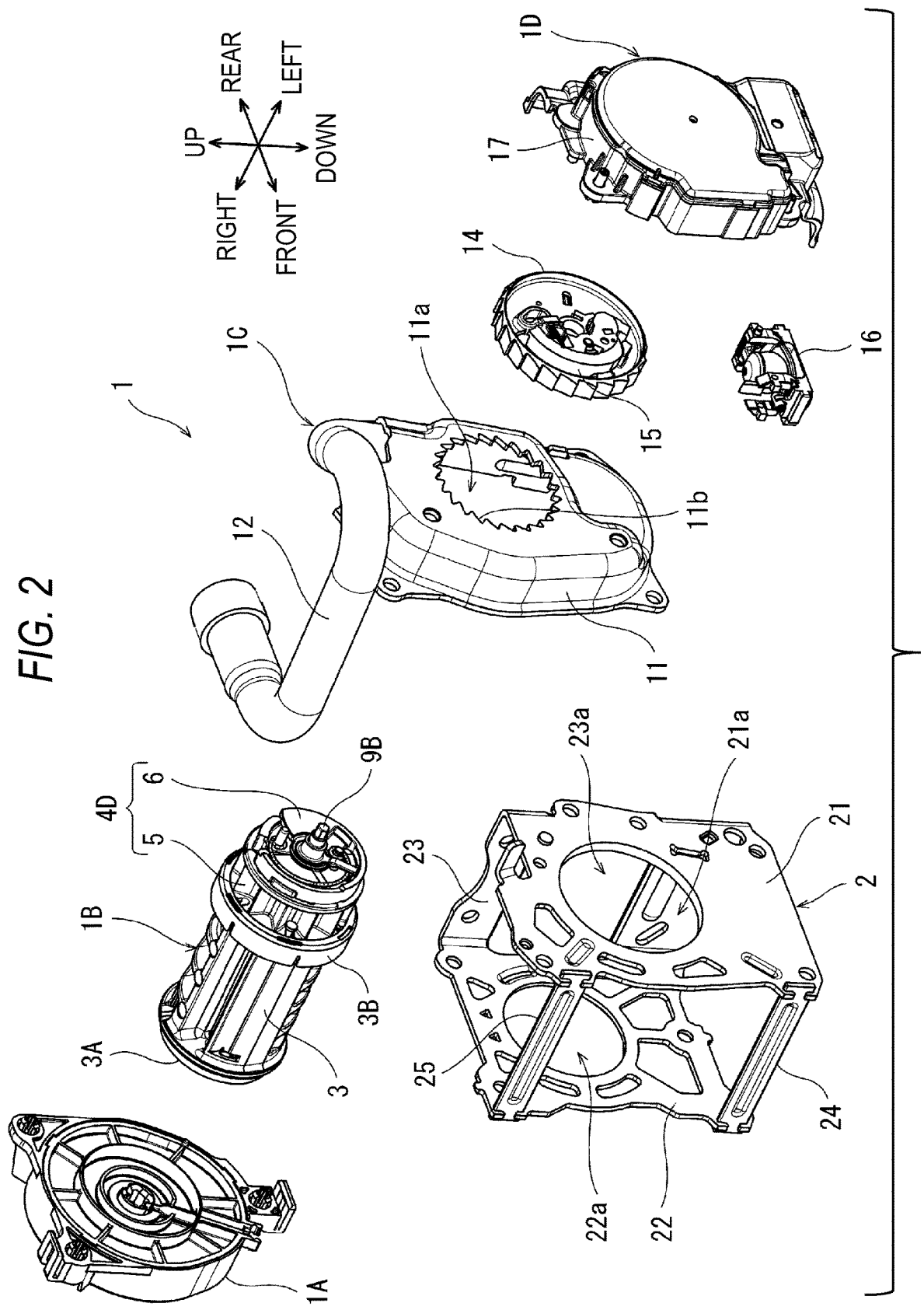
FIG. 2 is an exploded perspective view of the seat belt retractor illustrated in FIG. 1.

FIGS. 1 and 2 illustrate a seat belt retractor 1 according to an embodiment of the present disclosure. The seat belt retractor 1 is configured to prevent a webbing 10, which is a seat belt, from being pulled out in an emergency such as vehicle collision.

Specifically, the seat belt retractor 1 includes a housing 2, a winding spring unit 1A, a winding drum unit 1B, a pretensioner 1C, and a lock unit 1D. The winding drum unit 1B includes a winding drum 3 configured to wind up the webbing 10, and the housing 2 includes a first side wall 21 and a second side wall 22 that face each other in an axial direction of the winding drum 3.

The winding drum 3 is housed between the first side wall 21 and the second side wall 22 so as to be rotatable in a winding direction and a pull-out direction of the webbing 10. The housing 2 includes a back plate 23 that is formed by sheet metal processing together with the first side wall 21 and the second side wall 22, and that is perpendicular to the first side wall 21 and the second side wall 22. Hereinafter, for convenience of description, the axial direction of the winding drum 3 is referred to as a left-right direction (a first side wall 21 side is referred to as a leftward direction, and a second side wall 22 side is referred to as a rightward direction), and a thickness direction of the back plate 23 is referred to as a front-rear direction (a side of the side walls 21 and 22 is referred to as a forward direction, and an opposite side is referred to as a rearward direction). As illustrated in FIGS. 1 and 2, one side of a direction orthogonal to the left-right direction and the front-rear direction is referred to as an upward direction, and the other side of the direction orthogonal to the left-right direction and the front-rear direction is referred to as a downward direction.

Lower portions and upper portions of front sides of the first side wall 21 and the second side wall 22 of the housing 2 are connected by connecting bars 24 and 25. The first side wall 21 and the second side wall 22 are respectively provided with insertion holes 21a and 22a through which the winding drum 3 is inserted. In addition, the back plate 23 is provided with an opening 23a through which the winding drum 3 is exposed.

The winding spring unit 1A is attached to the second side wall 22. The pretensioner 1C is attached to the first side wall 21 of the housing 2. The lock unit 1D is attached to the pretensioner 1C.

Figure 3:
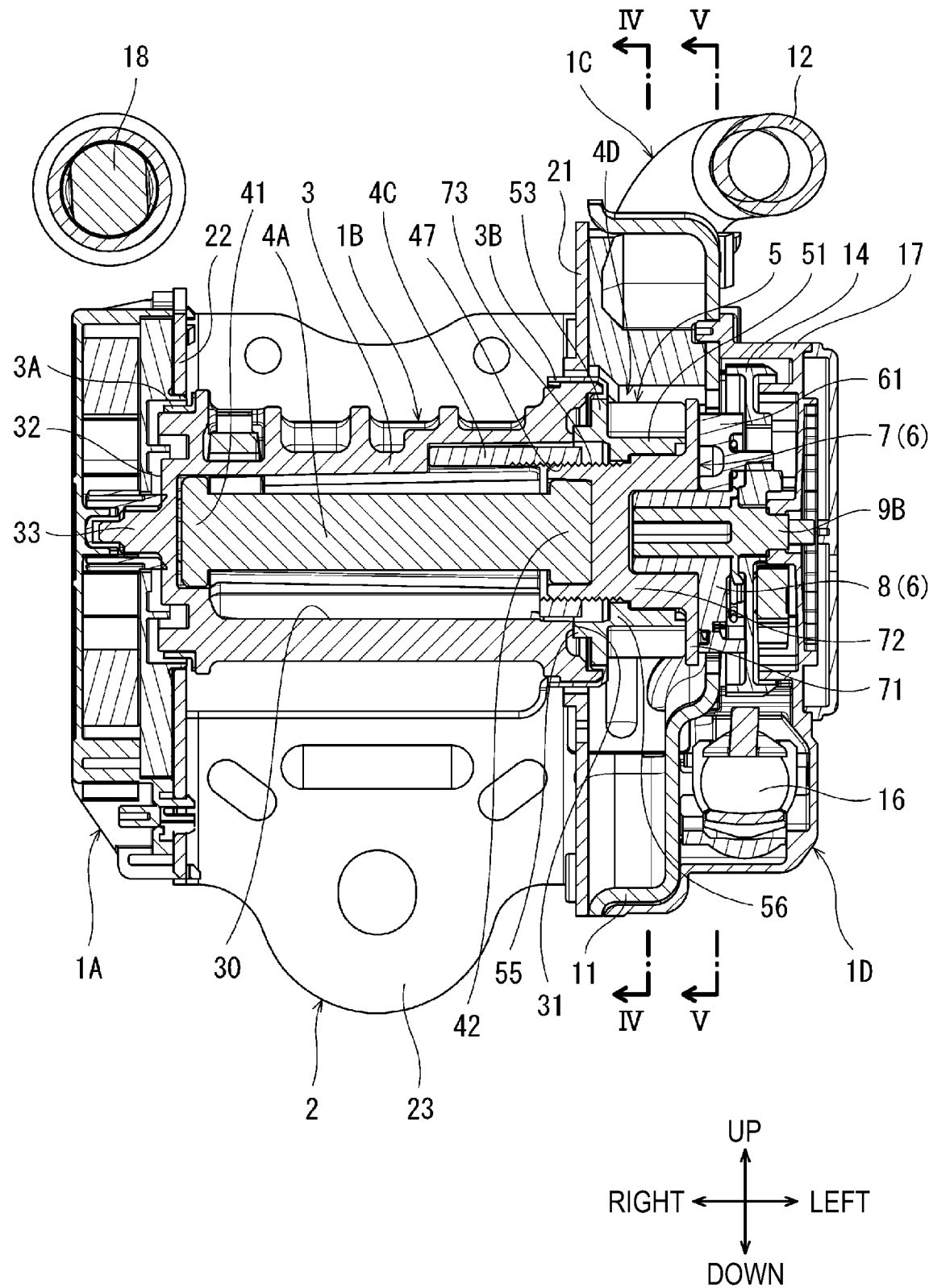
FIG. 3 is a cross-sectional view of the seat belt retractor illustrated in FIG. 1.

As illustrated in FIG. 3, the winding drum 3 includes a first end surface 31 on a side of the first side wall 21 of the housing 2, and a second end surface 32 on a side of the second side wall 22 of the housing 2. In the present embodiment, the winding drum 3 includes a shaft portion 33 that protrudes from the second end surface 32 in the rightward direction, and the shaft portion 33 is rotatably supported by the winding spring unit 1A. However, a torsion bar, which is an impact energy absorbing member 4A to be described later, may penetrate the winding drum 3, and a right end portion of the torsion bar may be rotatably supported by the winding spring unit 1A. Since a configuration of the winding spring unit 1A is known, a detailed description thereof will be omitted.

Figure 6:
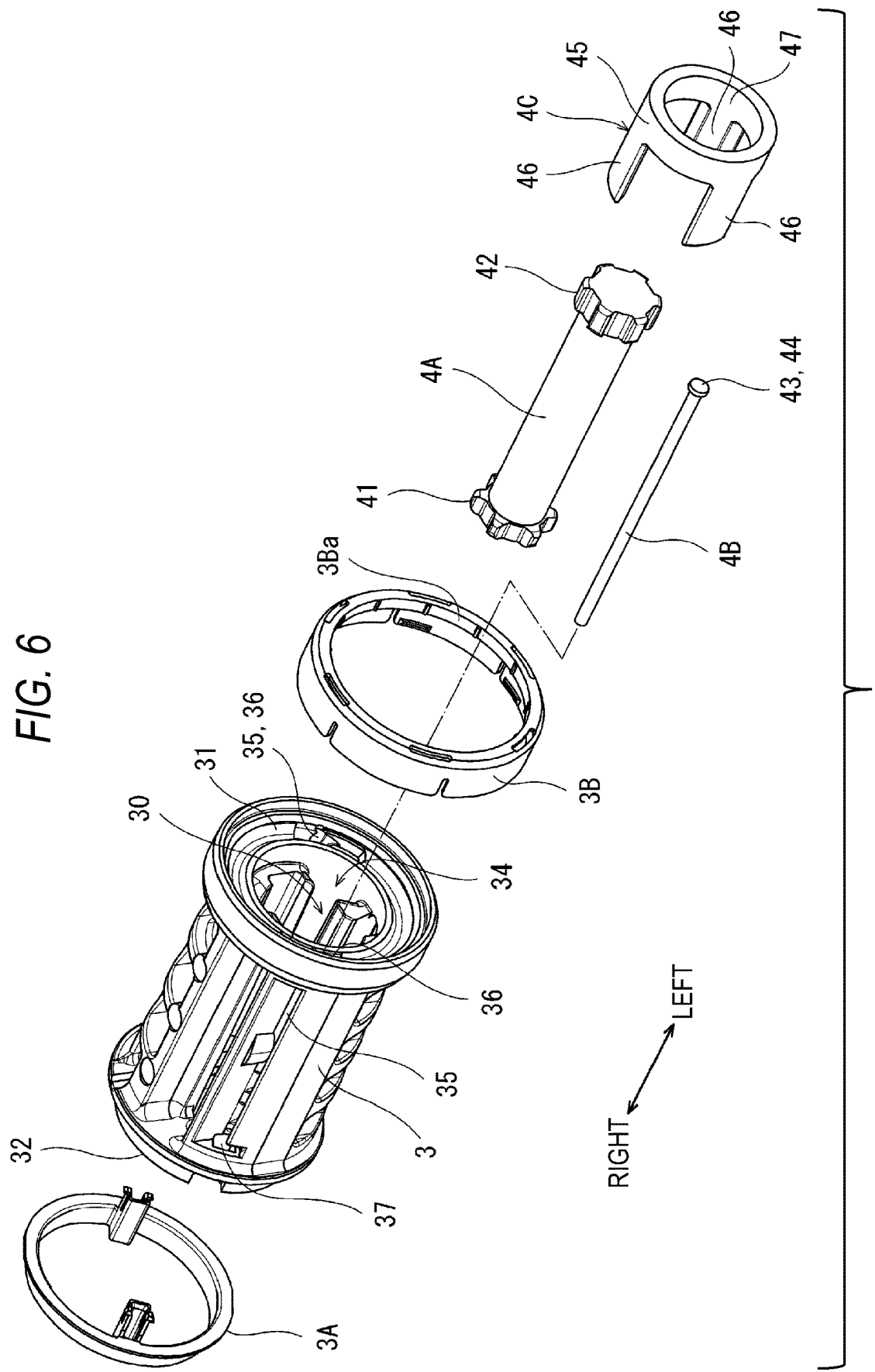
FIG. 6 is an exploded perspective view of a part of a winding drum unit.
Figure 7:
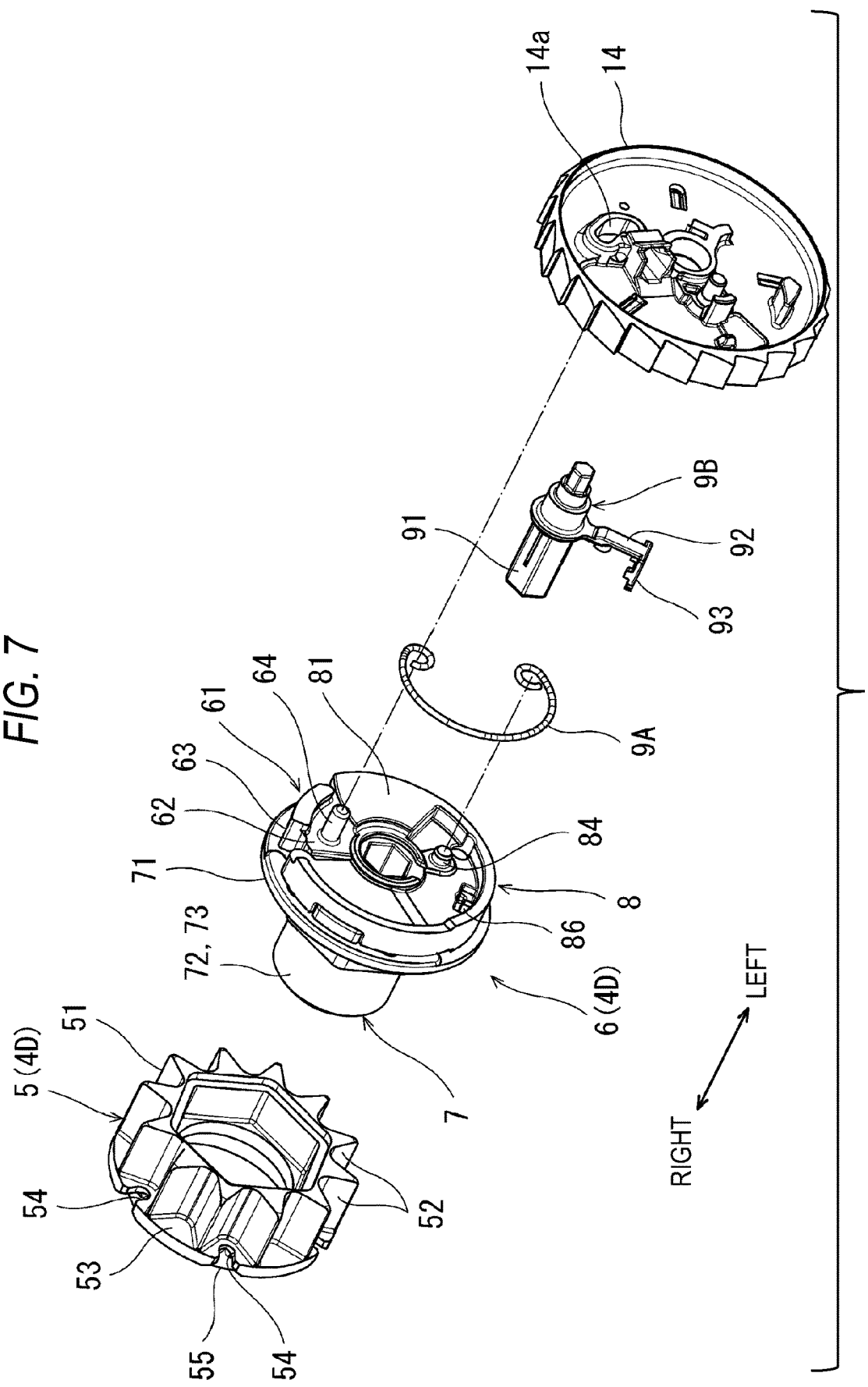
FIG. 7 is an exploded perspective view of the rest of the winding drum unit and a synchronized gear.

As illustrated in FIGS. 6 and 7, the winding drum unit 1B includes a bush 3A, a bearing 3B, the impact energy absorbing member 4A, an impact energy absorbing wire 4B, a stopper member 4C, a locking base 4D, a return spring 9A, and a rotation shaft 9B, in addition to the winding drum 3.

The locking base 4D is disposed to face the first end surface 31 of the winding drum 3, and is prevented from being rotated in the pull-out direction in the emergency of the vehicle. The locking base 4D includes a locking base main body 6, and a drive wheel 5 attached to the locking base main body 6 and facing the first end surface 31 of the winding drum 3.

The bush 3A and the bearing 3B are emergency means for smoothly rotating the winding drum 3 even when a relative position of the winding drum 3 with respect to the housing 2 is shifted in the emergency of the vehicle. As illustrated in FIG. 3, the bush 3A is attached to a right end portion of the winding drum 3, which is positioned in the insertion hole 22a of the second side wall 22, and the bearing 3B is attached to a left end portion of the winding drum 3, which is positioned in the insertion hole 21a of the first side wall 21. Further, the bearing 3B includes a folded portion 3Ba (see FIG. 6) that is folded back to an inner side of the left end portion of the winding drum 3, and that is configured to slide with the drive wheel 5 in a case where the winding drum 3 and the locking base 4D are rotated relative to each other.

The winding drum 3 has a center hole 30 extending along a center axis of the winding drum 3. In the present embodiment, the center hole 30 is bottomed and is opened only to the first end surface 31. However, in a case where the torsion bar, which is the impact energy absorbing member 4A, penetrates the winding drum 3 as described above, the center hole 30 may be opened not only in the first end surface 31 but also in the second end surface 32.

In the present embodiment, the impact energy absorbing member 4A is the torsion bar inserted into the center hole 30 of the winding drum 3. The impact energy absorbing member 4A includes one end side, opposite to the locking base 4D, coupled to the winding drum 3 without being rotatable relative to the winding drum 3, and the other end side coupled to the locking base 4D without being rotatable relative to the locking base 4D.

More specifically, the impact energy absorbing member 4A, which is the torsion bar, includes spline-shaped coupling portions 41 and 42 on the one end side and the other end side, respectively. The bottom of the center hole 30 of the winding drum 3 includes a spline-shaped recess for coupling with the coupling portion 41, and the coupling portion 41 is fitted into the recess.

The impact energy absorbing member 4A connects the winding drum 3 and the locking base 4D so as to be integrally rotatable in a normal state. And the impact energy absorbing member 4A is configured to be plastically deformed in a case where a pull-out force of the webbing 10 exceeds a predetermined value in a state where the locking base 4D is prevented from being rotated in the pull-out direction, so as to absorb impact energy while allowing the relative rotation between the winding drum 3 and the locking base 4D.

Figure 8:
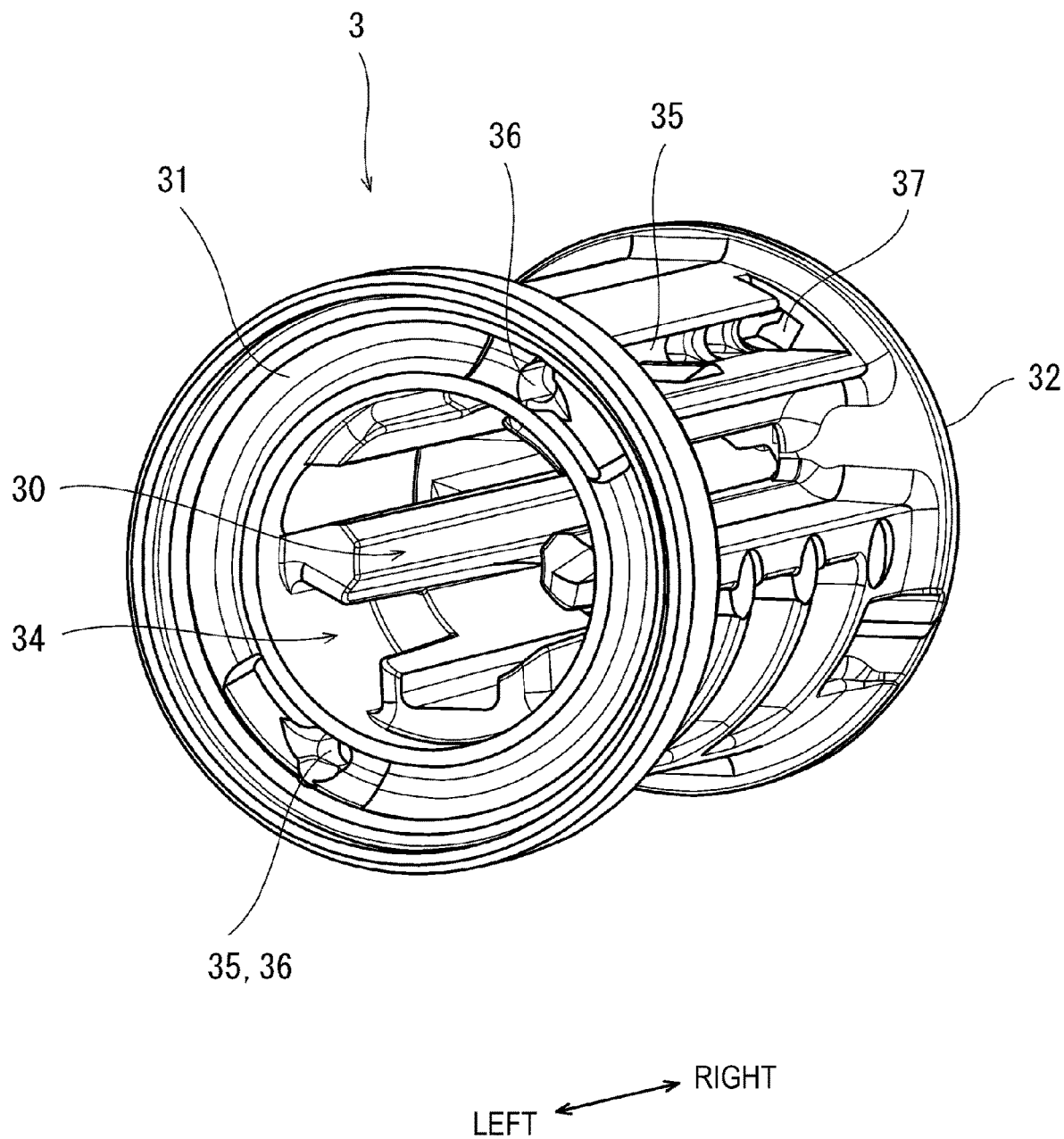
FIG. 8 is a perspective view of a winding drum.

The impact energy absorbing wire 4B is configured to absorb impact energy at an initial stage when the winding drum 3 and the locking base 4D rotate relative to each other. In the present embodiment, as illustrated in FIG. 8, the winding drum 3 includes two slots 35 for housing the impact energy absorbing wire 4B. However, the number of slots 35 may be one.

In the present embodiment, each slot 35 is formed along the axial direction of the winding drum 3, and extends across the first end surface 31 and the second end surface 32 of the winding drum 3. That is, each slot 35 forms a first opening 36 in the first end surface 31, and forms a second opening 37 in the second end surface 32 of the winding drum 3. The bushing 3A is attached to the right end portion of the winding drum 3 by using the second opening 37. In addition, in the present embodiment, each slot 35 has a groove shape recessed obliquely from an outer circumferential surface of the winding drum 3. However, the slot 35 may be a hole extending in the axial direction of the winding drum 3.

The impact energy absorbing wire 4B is housed in one of the slots 35 in a state where a head portion 43 (see FIG. 6) protrudes from the first opening 36 of the slot 35. The head portion 43 of the impact energy absorbing wire 4B is attached to the locking base 4D. The impact energy absorbing wire 4B is configured to be pulled out from the first opening 36 while being plastically deformed in a case where the winding drum 3 and the locking base 4D are relatively rotated, so as to absorb the impact energy.

The stopper member 4C defines an allowable amount of the relative rotation between the winding drum 3 and the locking base 4D in case where the impact energy absorbing member 4A absorbs the impact energy. The stopper member 4C is held in the center hole 30 of the winding drum 3 without being rotatable relative to the winding drum 3 and so as to be movable in the left-right direction.

As illustrated in FIG. 6, the stopper member 4C has a tubular shape through which the impact energy absorbing member 4A, which is the torsion bar, is inserted. The stopper member 4C is formed with a female screw 47 on an inner circumferential surface of the stopper member 4C.

In the present embodiment, the stopper member 4C includes an annular portion 45, and three claw portions 46 that protrude from the annular portion 45 in the rightward direction. On the other hand, the center hole 30 of the winding drum 3 includes three guide grooves 34. Since respective the three claw portions 46 are fitted into the three guide grooves 34, the stopper member 4C is held by the winding drum 3 without being rotatable relative to the winding drum 3 and so as to be movable in the left-right direction. However, instead of the stopper member 4C including the claw portions 46, a cross-sectional shape of an outer shape of the stopper member 4C and a cross-sectional shape of a left end portion of the center hole 30 of the winding drum 3 may be polygonal.

Figure 9:
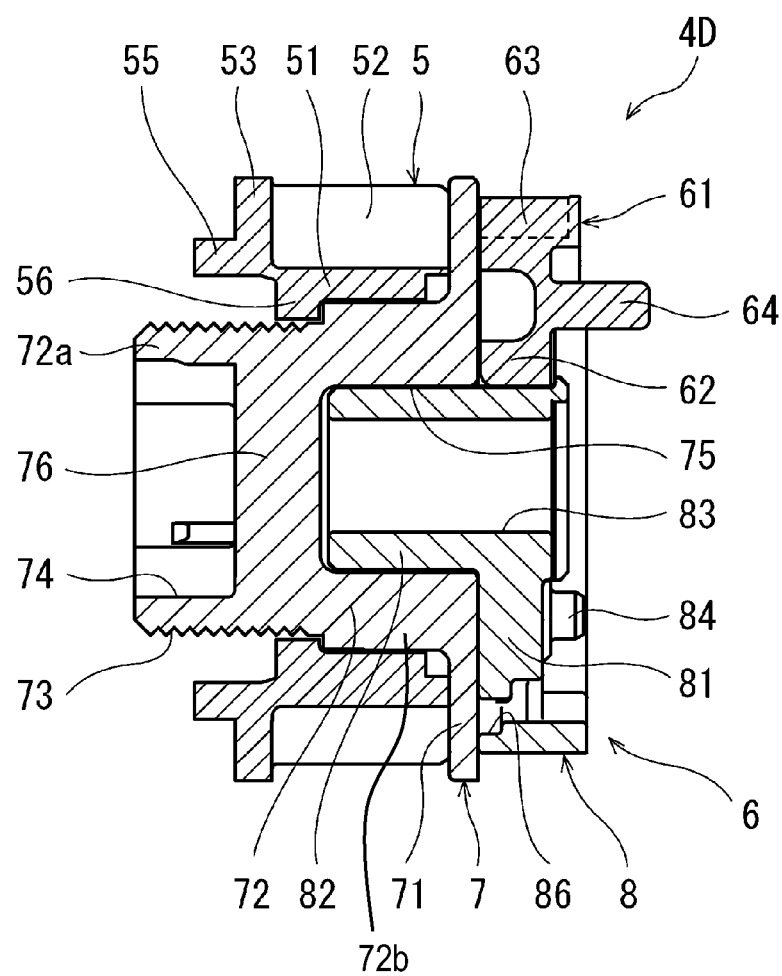
FIG. 9 is a cross-sectional view of a locking base.

As illustrated in FIGS. 3 and 9, the locking base 4D includes a shaft portion 72a that protrudes from the drive wheels 5 in the rightward direction and that is coaxial with the winding drum 3, and a male screw 73 onto which the female screw 47 of the stopper member 4C is screwed is formed on an outer circumferential surface of the shaft portion 72a. In the present embodiment, as illustrated in FIG. 3, during the relative rotation between the winding drum 3 and the locking base 4D, the stopper member 4C moves from a position at which the stopper member 4C is separated from the drive wheel 5 to a position at which the stopper member 4C comes into contact with the drive wheel 5, whereby the relative rotation between the winding drum 3 and the locking base 4D is restricted to a predetermined amount. In other words, the stopper member 4C is prevented from being moved in the axial direction of the winding drum 3 by coming into contact with the drive wheel 5.

Figure 10:
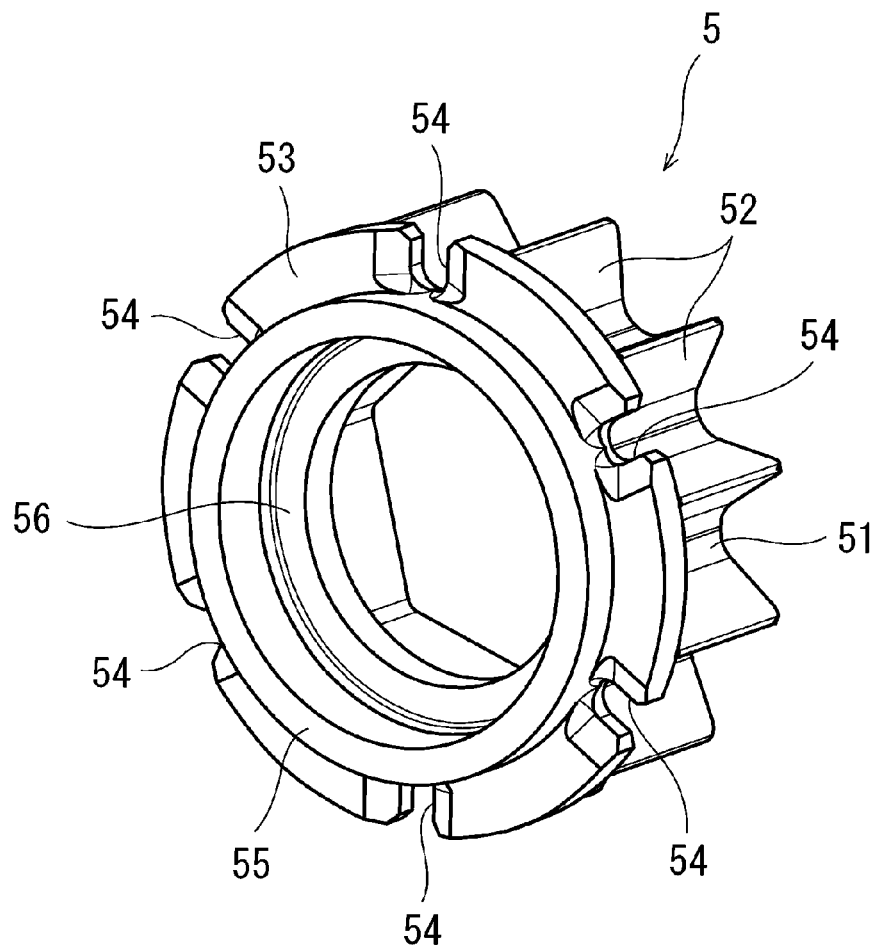
FIG. 10 is a perspective view of a drive wheel.

As illustrated in FIGS. 7 and 10, the drive wheel 5 includes a main body portion 51 having a fitting hole with a hexagonal cross-sectional shape, a plurality of teeth 52 formed on an outer circumferential surface of the main body portion 51, and an annular flange 53 that protrudes outward in a radial direction from the main body portion 51 on a right side of the teeth 52.

As illustrated in FIG. 3, the flange 53 of the drive wheel 5 faces the first end surface 31 of the winding drum 3. The flange 53 includes a plurality of (six in the illustrated example) holding portions 54 separated from each other in a circumferential direction around a rotation center of the winding drum 3. The head portion 43 of the impact energy absorbing wire 4B is attached to one of the holding portions 54.

In the present embodiment, the holding portions 54 are grooves that are opened outward in the radial direction. The head portion 43 of the impact energy absorbing wire 4B includes a coming-off prevention portion 44 (see FIG. 6) that is located on a side of the flange 53 opposite to the winding drum 3, and that has a width larger than that of the groove that is the holding portion 54. However, the holding portions 54 may be holes that penetrate the flange 53.

Figure 14:
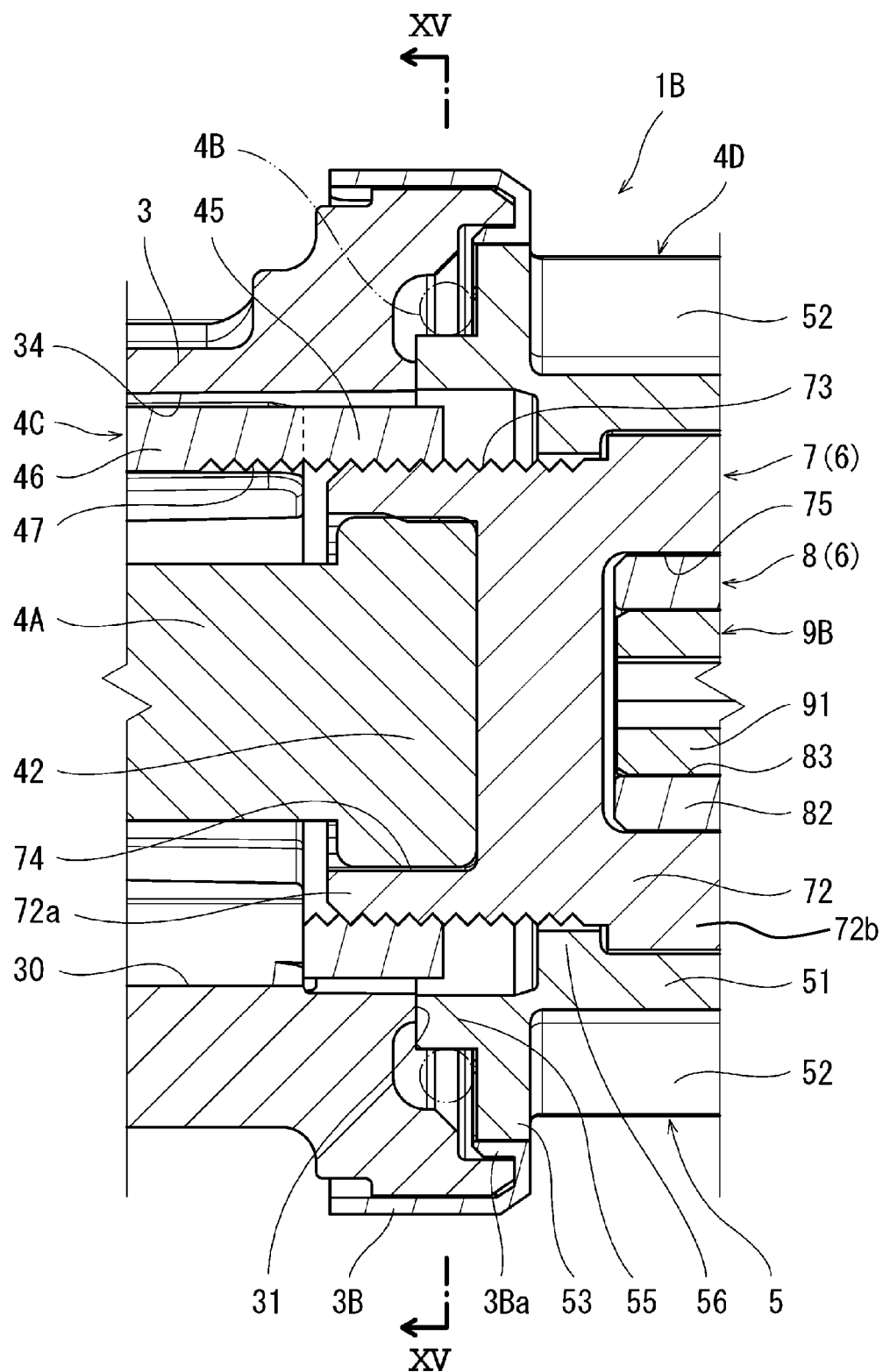
FIG. 14 is a cross-sectional view of a part of the winding drum unit.
Figure 15A:
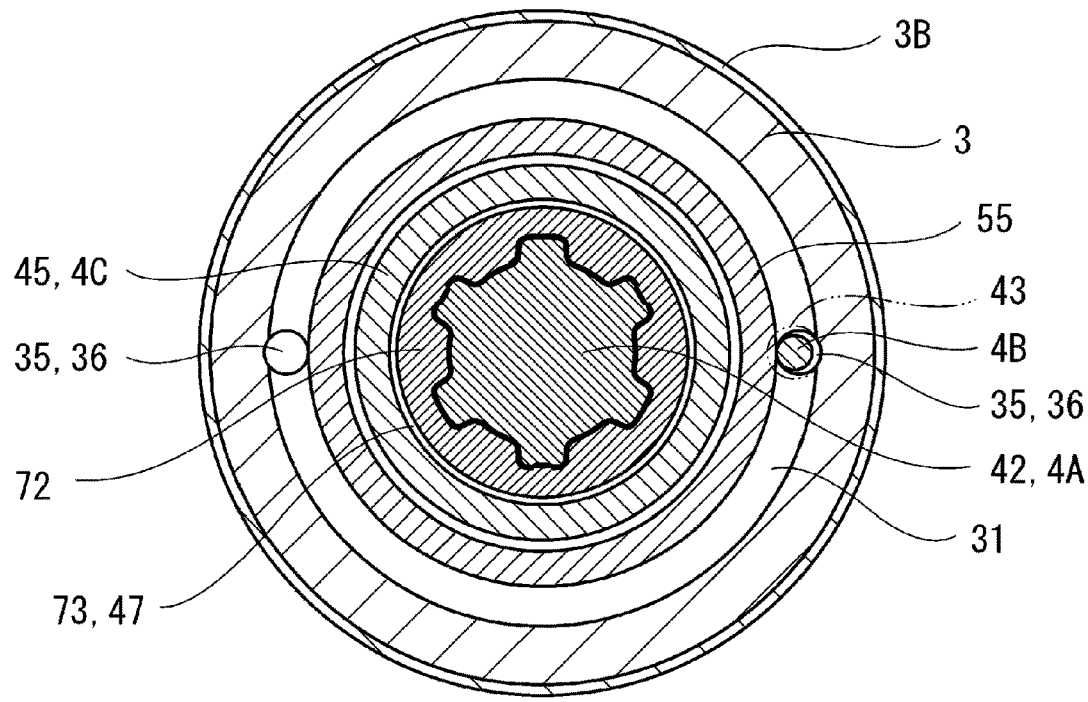
FIG. 15A is a cross-sectional view taken along a line XV-XV in FIG. 14, which illustrates a state before the winding drum and the locking base are rotated relative to each other.
Figure 15B:
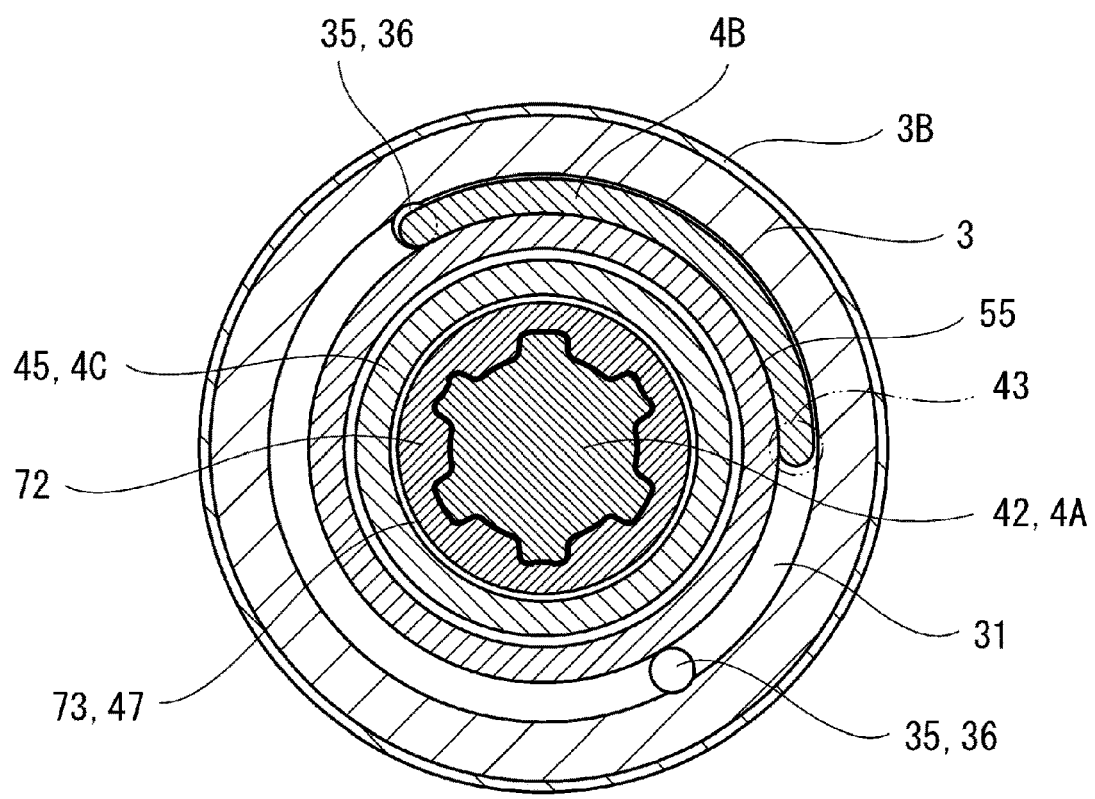
FIG. 15B is a cross-sectional view taken along a line XV-XV in FIG. 14, which illustrates a state after the winding drum and the locking base are rotated relative to each other.

The drive wheel 5 has an annular protrusion that protrudes from the flange 53 toward the first end surface 31 of the winding drum 3, and that is coaxial with the winding drum 3. In other words, the annular protrusion configures a ring 55 that is provided integrally with the drive wheel 5 between the first end surface 31 of the winding drum 3 and the drive wheel 5, and that is configured to be coaxially rotatable relative to the winding drum 3. As illustrated in FIGS. 14, 15A, and 15B, the winding drum 3 are rotated relative to the locking base 4D, whereby the impact energy absorbing wire 4B pulled out from the first opening 36 of the slot 35 is wound around an outer circumference of the ring 55.

An inner diameter of the ring 55 is larger than an outer diameter of the stopper member 4C, and the stopper member 4C is configured to be movable while being located radially inside the ring 55.

In addition, at least a part of the male screw 73 formed on the shaft portion 72a of the locking base 4D is located radially inside the ring 55.

In the present embodiment, a substantially center of the male screw 73 in the axial direction is located radially inside the ring 55.

As illustrated in FIG. 14, in the present embodiment, the ring 55 comes into contact with the first end surface 31 of the winding drum 3. In a case where the winding drum 3 and the locking base 4D is rotated relative to each other, the winding drum 3 and the drive wheel 5 are rotate relative to each other while the ring 55 comes into contact with the first end surface 31 of the winding drum 3 in the axial direction of the winding drum 3, and while an outer circumference of the flange 53 of the drive wheel 5 comes into contact with the folded portion 3Ba of the bearing 3B attached to the winding drum 3 in a radial direction of the winding drum 3.

As illustrated in FIGS. 10 and 14, an annular flange 56 protrudes from an inner circumferential surface of the main body portion 51. The flange 56 is a portion that comes into contact with the stopper member 4C. In this way, it is possible to secure a large contact area between the flange 56 and the stopper member 4C by bringing the stopper member 4C into contact with the flange 56 of the drive wheel 5 instead of a stepped portion (proximal end portion 72b described later) of the locking base main body 6.

The pretensioner 1C rotates the winding drum 3 in the winding direction, via the locking base 4D and the impact energy absorbing member 4A, by rotating the drive wheel 5 in the winding direction of the winding drum 3 in the emergency of the vehicle. As illustrated in FIGS. 2 to 4, the pretensioner 1C includes a pretensioner casing 11 attached to the first side wall 21 of the housing 2, a pipe 12 extending from the pretensioner casing 11 while being bent, a moving member 13 disposed in the pipe 12, and a gas generator 18 disposed in a distal portion of the pipe 12.

In the present embodiment, the moving member 13 has a rod shape, and is plastically deformed by the digging of the teeth 52 of the drive wheel 5. However, the moving member 13 may be implemented by a plurality of divided bodies (for example, spheres) arranged at the same pitch as the teeth 52 of the drive wheel 5. In the emergency of the vehicle, the moving member 13 is engaged with the teeth 52 of the drive wheel 5 while being pushed out from the pipe 12 by gas generated in the gas generator 18, so as to rotate the drive wheel 5 in the winding direction. As the drive wheel 5 is rotated, the locking base main body 6, the impact energy absorbing member 4A, and the winding drum 3 are also rotated. After the pretensioner 1C is activated, the moving member 13 is prevented from being pushed back into the pipe 12 by a pressure of the gas in the pipe 12, and thus the drive wheel 5 is prevented from being rotated in the pull-out direction.

Figure 5:
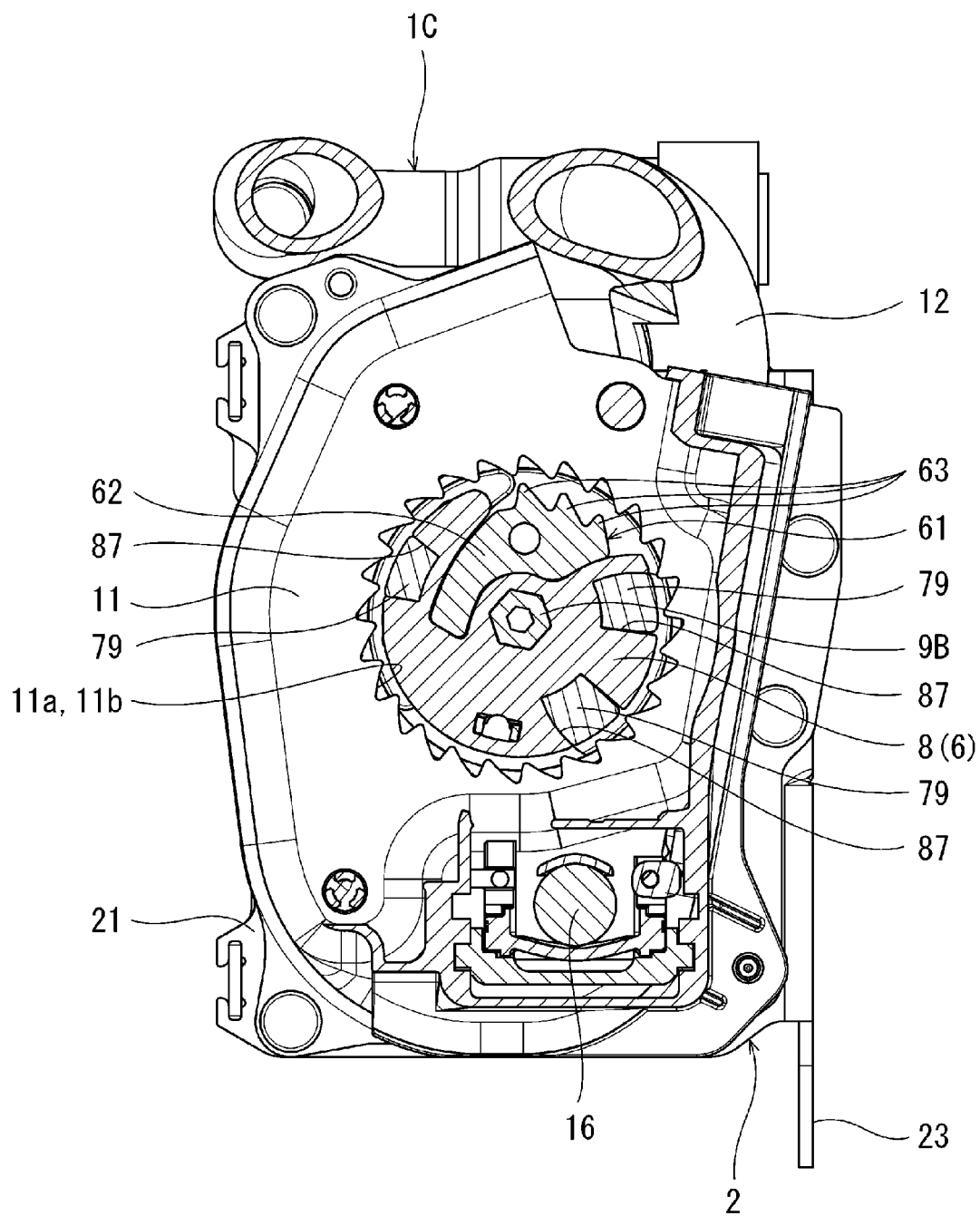
FIG. 5 is a cross-sectional view taken along a line V-V in FIG. 3.

As illustrated in FIGS. 2 and 5, the pretensioner casing 11 is provided with an opening 11a through which the locking base main body 6 is inserted, and the opening 11a has internal teeth 11b formed on a circumferential edge of the opening 11a. On the other hand, the locking base main body 6 includes a lock member 61 configured to be engageable with the internal teeth 11b. The lock member 61 is engaged with the internal teeth 11b to prevent the locking base 4D from being rotated in the pull-out direction in the emergency of the vehicle.

Figure 11:
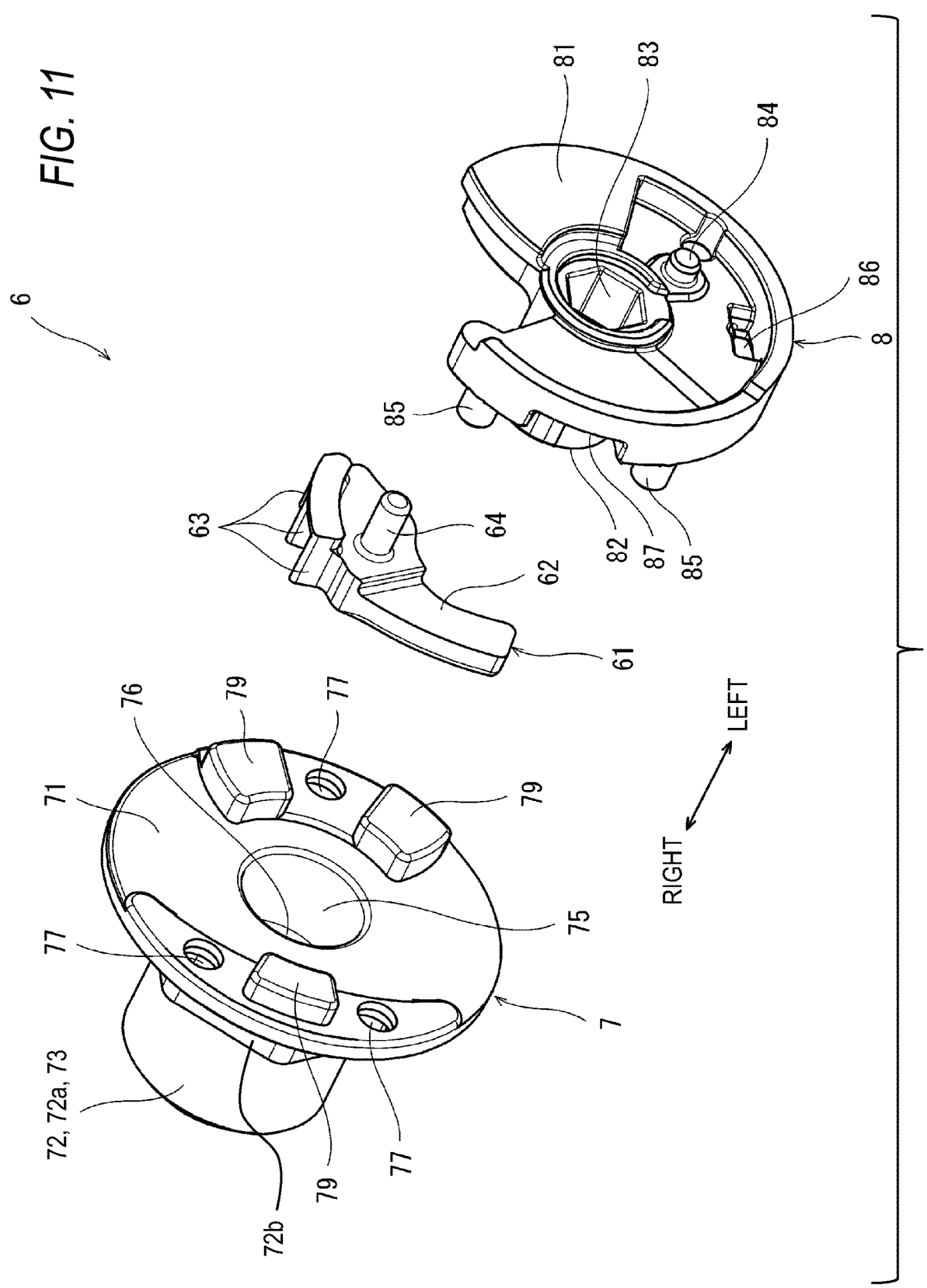
FIG. 11 is an exploded perspective view of a locking base main body and a lock member.
Figure 12:
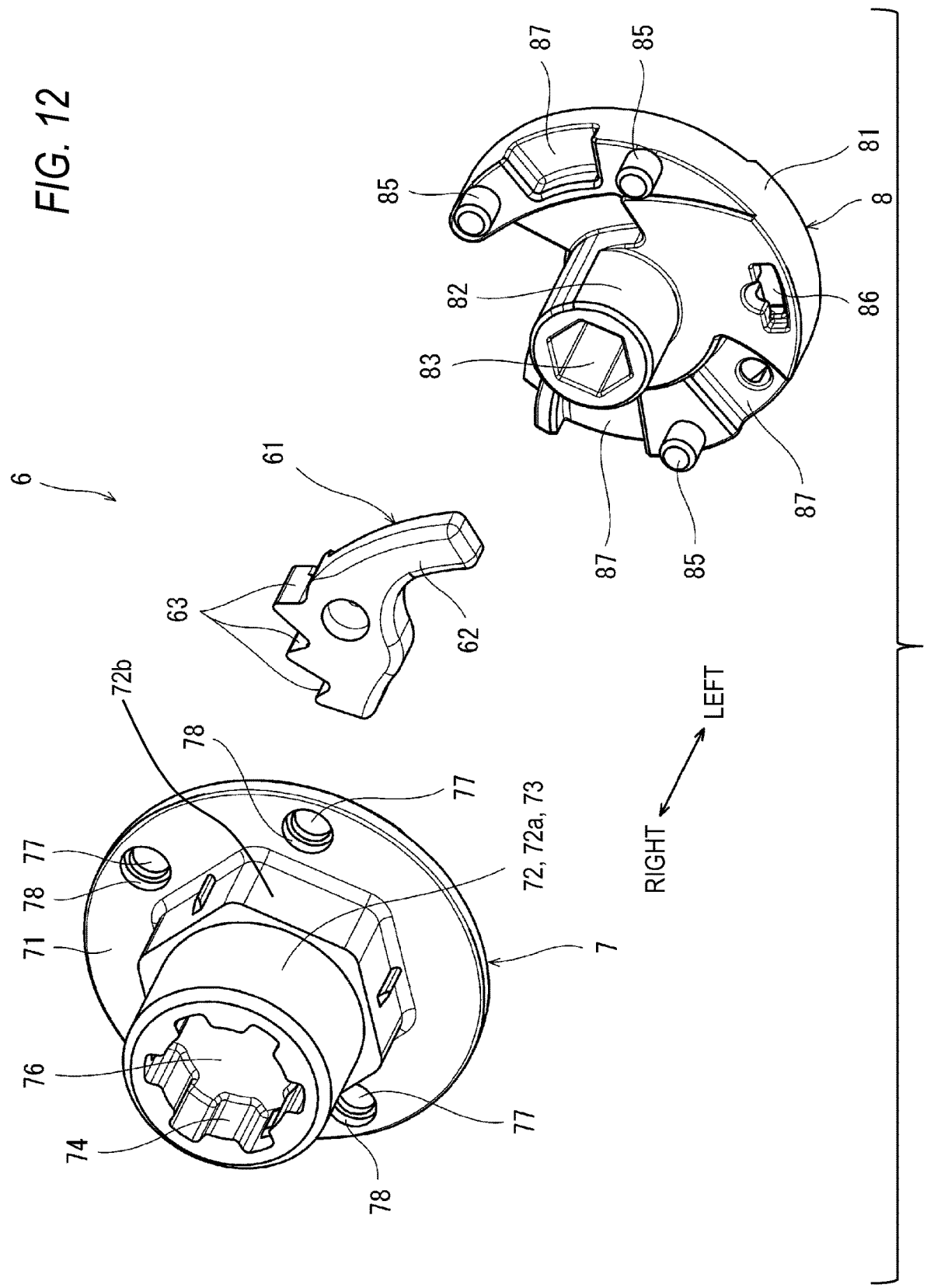
FIG. 12 is an exploded perspective view of the locking base main body and the lock member as viewed from an opposite side.

As illustrated in FIGS. 9, 11, and 12, the locking base main body 6 includes a first base member 7 to which the drive wheel 5 is attached, and a second base member 8 which is attached to the first base member 7 on a side of the first base member 7 opposite to the winding drum 3 without being rotatable relative to the first base member 7. The lock member 61 is held between the first base member 7 and the second base member 8.

More specifically, the first base member 7 includes a disk-shaped first main body portion 71, and a protruding portion 72 that protrudes from the first main body portion 71 in the rightward direction. As illustrated in FIG. 3, the drive wheel 5 is disposed between the first main body portion 71 and the first end surface 31 of the winding drum 3, and the protruding portion 72 penetrates the drive wheel 5. That is, the protruding portion protrudes toward the winding drum 3 from a portion of the locking base 4D positioned on an opposite side of the winding drum 3 with respect to the drive wheel 5. A right side portion of the protruding portion 72 with respect to the flange 56 of the drive wheel 5 configures the shaft portion 72a of the locking base 4D. In other words, the shaft portion 72a is formed in a distal end side of the protruding portion 72.

The male screw 73 is formed on an outer circumferential surface of a distal end side of the protruding portion 72. The protruding portion 72 includes, at a proximal side of the male screw 73, a proximal end portion 72b protruding radially outward more than the male screw 73. A proximal end portion 72b of the protruding portion 72 is formed to have a hexagonal cross-sectional shape. The fitting hole of the main body portion 51 of the drive wheel 5 is also formed to have the hexagonal cross section, and by fitting the proximal end portion 72b into the fitting hole, the drive wheel 5 is attached to the first base member 7 without being rotatable relative to the first base member 7. However, the proximal end portion 72b of the protruding portion 72 may be formed to have a non-circular cross-sectional shape such as polygonal except for hexagonal. The fitting hole of the main body portion 51 of the drive wheel 5 is also formed to have the non-circular cross-sectional shape, and by fitting the proximal end portion 72b into the fitting hole, the drive wheel 5 is attached to the first base member 7 without being rotatable relative to the first base member 7.

The first base member 7 includes a first recess 74 that is recessed from a distal end surface of the protruding portion 72, and a second recess 75 that is coaxial with the first recess 74 and that is recessed from a surface of the first main body portion 71 on a side opposite to the drive wheel 5. The first recess 74 is a spline-shaped recess for coupling with the coupling portion 42 of the impact energy absorbing member 4A, and the coupling portion 42 is fitted into the first recess 74. In the present embodiment, the second recess 75 has a circular cross-sectional shape. In the present embodiment, the first base member 7 includes a partition 76 that separates the first recess 74 and the second recess 75. That is, the first recess 74 and the second recess 75 are bottomed.

The second base member 8 includes a plate-shaped second main body portion 81 that overlaps the first main body portion 71, and a fitting protrusion 82 that protrudes from the second main body portion 81 in the rightward direction. In the present embodiment, the second main body portion 81 includes three engagement concave portions 87, and by engaging three engagement convex portions 79 provided on the first main body portion 71 with the respective engagement concave portions 87, the second base member 8 is attached to the first base member 7 without being rotatable relative to the first base member 7. The fitting protrusion 82 has a circular cross-sectional shape, and the fitting protrusion 82 is fitted into the second recess 75. However, the second recess 75 and the fitting protrusion 82 may have a non-circular cross sectional shape, and by fitting the fitting protrusion 82 into the second recess 75, the second base member 8 may be attached to the first base member 7 without being rotatable relative to the first base member 7. In this case, the engagement concave portions 87 and the engagement convex portions 79 may be omitted.

In the present embodiment, the second main body portion 81 of the second base member 8 includes three crimping protrusions 85 protruding in the rightward direction, whereas the first main body portion 71 of the first base member 7 is provided with three through holes 77 through which the crimping protrusions 85 are inserted. A crimping concave portion 78 that is coaxial with the through hole 77 and that has a larger diameter than the through hole 77 is formed on a side of the first main body portion 71 opposite to the second main body portion 81. A portion of each crimping protrusion 85, which protrudes from the through hole 77, is crimped to have a larger diameter than the through hole 77 in the crimping concave portion 78 and to have an outer diameter substantially equal to an inner diameter of the crimping concave portion 78 (in FIGS. 11 and 12, the crimping protrusion 85 is drawn in a shape before crimping).

The lock member 61 includes a substantially arc-shaped and plate-shaped main body portion 62 that is held by the first main body portion 71 of the first base member 7 and the second main body portion 81 of the second base member 8, a plurality of (three in the illustrated example) engaging teeth 63 that are formed on an outer side surface of the main body portion 62 and that are configured to be engageable with the internal teeth 11b, and an operation shaft 64 that protrudes from the main body portion 62 in the leftward direction.

The second main body portion 81 of the second base member 8 includes a pin 84 that protrudes in the leftward direction. The return spring 9A has a substantially arc shape as illustrated in FIG. 7, and the return spring 9A includes one end engaged with the operation shaft 64 of the lock member 61 and the other end engaged with the pin 84. The return spring 9A is configured to maintain the lock member 61 at a non-engagement position illustrated in FIG. 13A.

The second base member 8 is provided with an engagement hole 83 that is coaxial with the fitting protrusion 82 and that is opened in the leftward direction. In the present embodiment, the engagement hole 83 penetrates the second base member 8, and is also opened in the rightward direction. The engagement hole 83 has a hexagonal cross-sectional shape.

The lock member 61 is operated by a synchronized gear 14 (see FIGS. 2 and 7). As illustrated in FIG. 2, the lock unit 1D includes a cover member 17 that houses the synchronized gear 14 and a vehicle sensor 16. The synchronized gear 14 includes a webbing sensor 15. The webbing sensor 15 is configured to be activated in a case where the webbing 10 is rapidly pulled out, whereby the synchronized gear 14 is prevented from being rotated in the pull-out direction. The vehicle sensor 16 is configured to be activated in a case where an acceleration of the vehicle changes largely, whereby the synchronized gear 14 is prevented from being rotated in the pull-out direction.

Figure 13A:
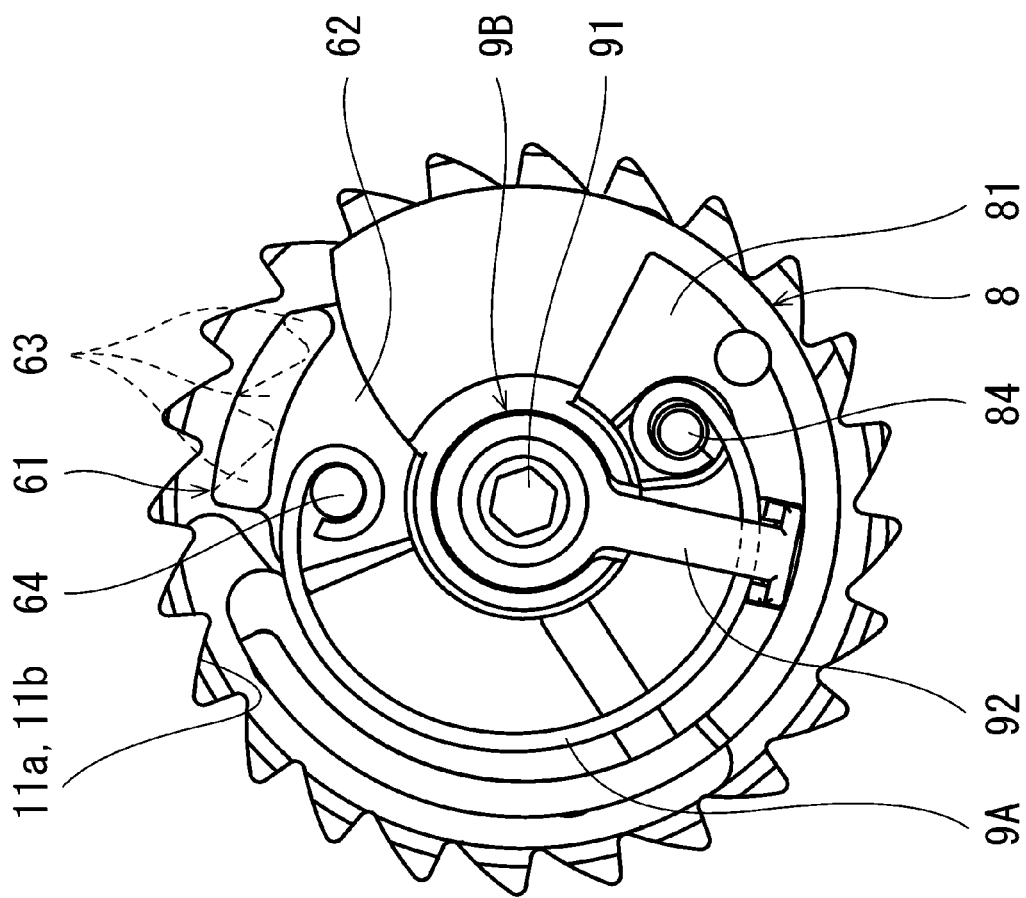
FIG. 13A illustrates a state of a return spring when the lock member is located at a non-engagement position.

In a case where the synchronized gear 14 is prevented from being rotated in the pull-out direction, the locking base 4D is rotated relative to the synchronized gear 14 together with the winding drum 3, and the operation shaft 64 of the lock member 61 is operated in a guide hole 14a (see FIG. 7) of the synchronized gear 14, whereby the lock member 61 moves from the non-engagement position illustrated in FIG. 13A to an engagement position illustrated in FIG. 13B.

As illustrated in FIG. 7, the rotation shaft 9B includes a rod-shaped main body portion 91, and an arm 92 extending outward from the main body portion 91 in the radial direction. A right side portion of the main body portion 91 has a hexagonal cross-sectional shape, and the right side portion is fitted into and engaged with the engagement hole 83 of the second base member 8. The arm 92 is for restraining the return spring 9A, and a hook 93 provided at a distal end of the arm 92 is engaged with an engagement hole 86 provided in the second main body portion 81 of the second base member 8. As illustrated in FIG. 3, a left side portion of the rotation shaft 9B penetrates the synchronized gear 14 and is rotatably supported by the cover member 17 of the lock unit 1D.

As described above, in the seat belt retractor 1 according to the present embodiment, the ring 55 around which the impact energy absorbing wire 4B is wound is configured to be rotatable relative to the winding drum 3, and thus the impact energy absorbing wire 4B can absorb the impact energy stably. The stopper member 4C is configured to be movable while being located radially inside the ring 55, and thus a dimension of the locking base 4D in the axial direction of the winding drum 3 can be reduced. Therefore, the seat belt retractor 1 can be reduced in size in the axial direction of the winding drum 3.

In the present embodiment, at least a part of the male screw 73 formed on the shaft portion 72a of the locking base 4D is located radially inside the ring 55, and thus the shaft portion 72a can be easily shortened.

In the present embodiment, the locking base 4D includes the drive wheel 5, and thus the dimension of the locking base 4D in the axial direction of the winding drum 3 is easily reduced in the seat belt retractor 1 including the pretensioner 1C.

Further, in the present embodiment, the stopper member 4C that is configured to be movable while being located radially inside the ring 55 comes into contact with the drive wheel 5, and thus the dimension of the locking base 4D in the axial direction of the winding drum 3 is easily reduced.

<Modification>

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

For example, the impact energy absorbing member 4A is not limited to the torsion bar as long as the impact energy is absorbed during the relative rotation between the winding drum 3 and the locking base 4D. For example, the impact energy absorbing member 4A may be a wire and the like that are bent and deformed by the relative rotation between the winding drum 3 and the locking base 4D to absorb the impact energy.

Figure 16:
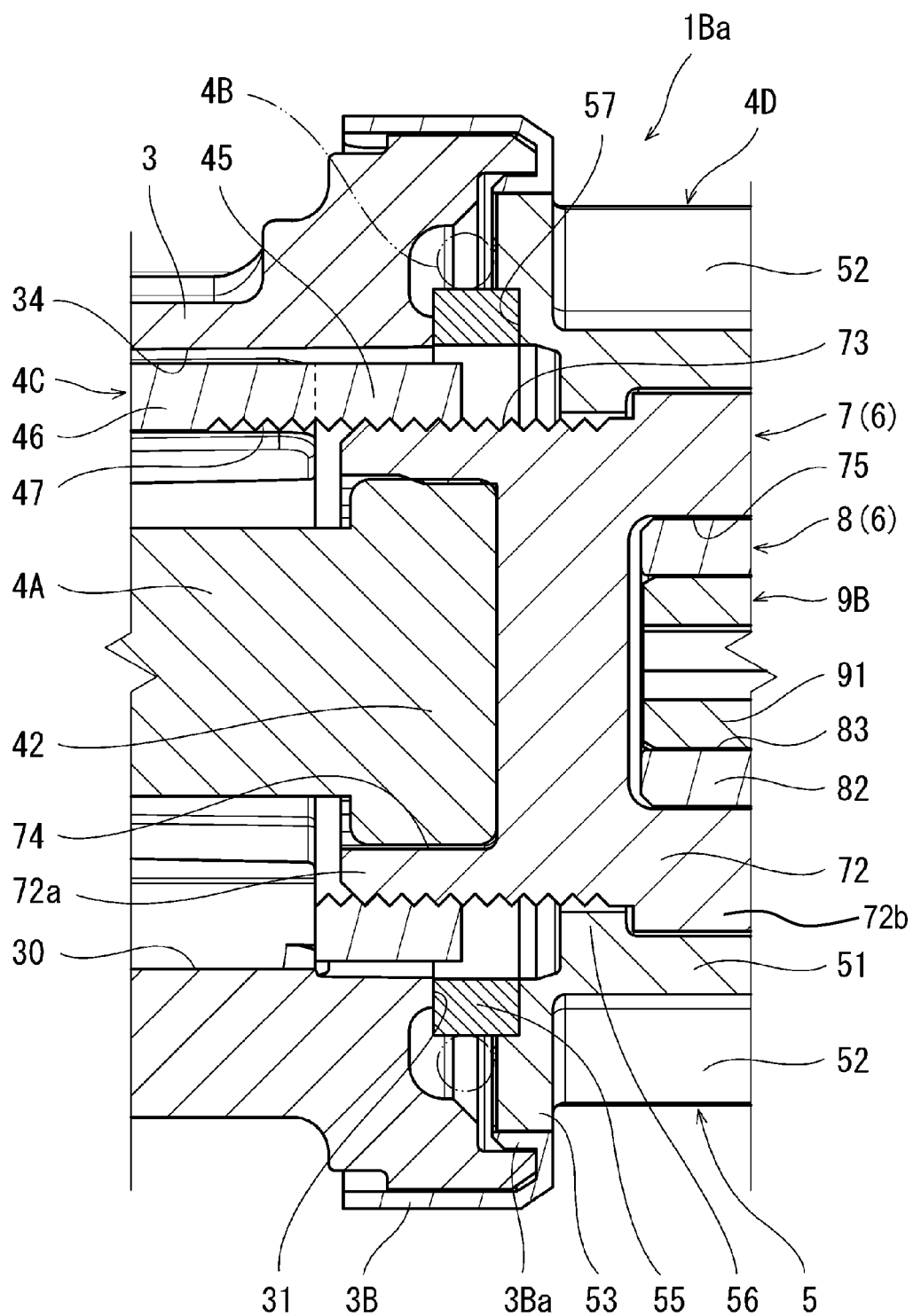
FIG. 16 is a cross-sectional view of a part of a winding drum unit according to a first modification.

As in a winding drum unit 1Ba according to a first modification illustrated in FIG. 16, the ring 55 around which the impact energy absorbing wire 4B is wound may be separated from the locking base 4D. In this way, in a case where the ring 55 is separated from the locking base 4D, a shape and a material of the ring 55 are easily optimized. Therefore, a cost and a weight of the seat belt retractor 1 can be easily reduced. However, in a case where the ring 55 is integrated with the locking base 4D as in the above embodiment, the number of components can be reduced.

Figure 17:
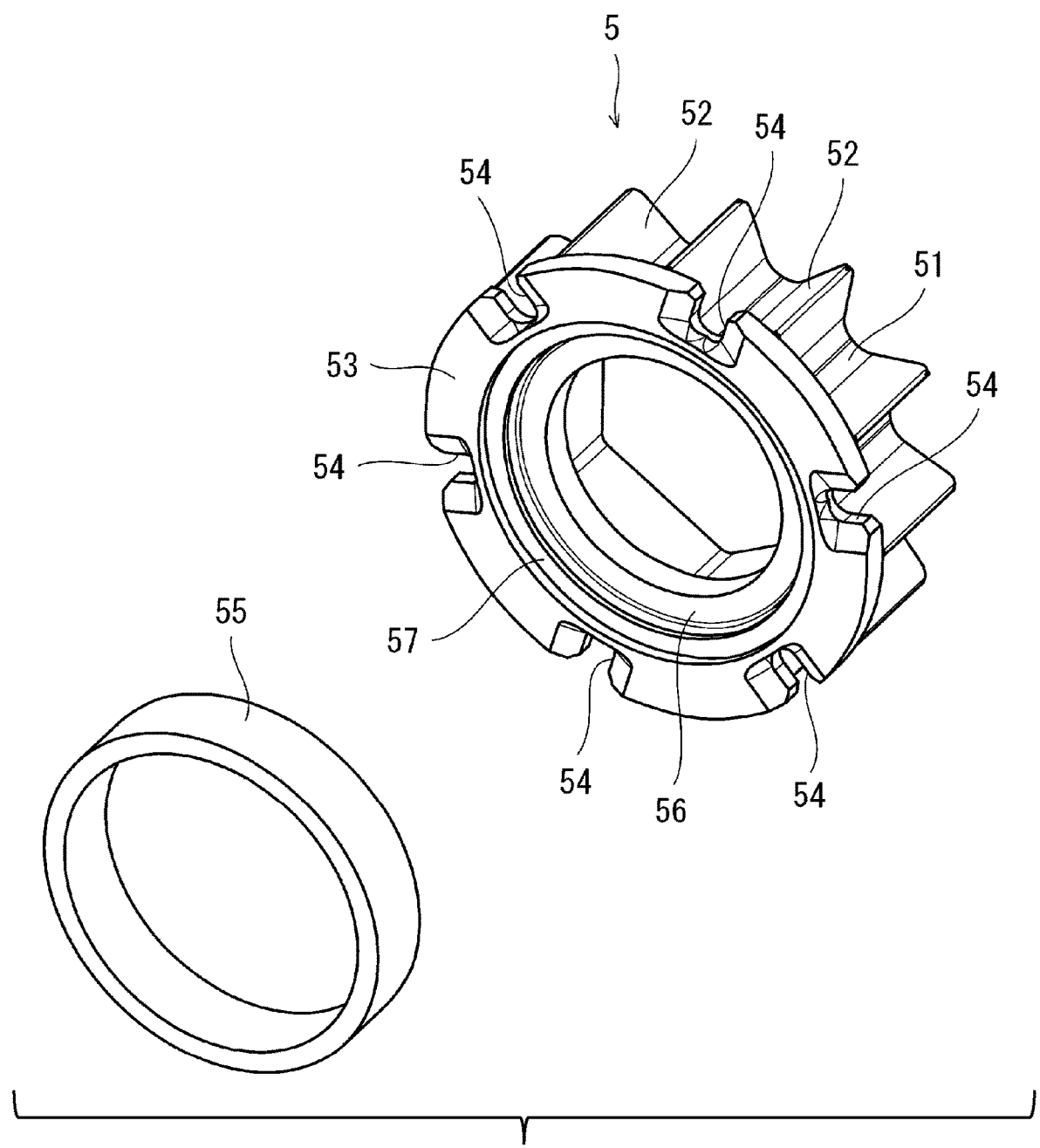
FIG. 17 is an exploded perspective view of a ring and a drive wheel in the winding drum unit according to the first modification.

In the winding drum unit 1Ba according to the first modification illustrated in FIG. 16, the ring 55 is attached to the drive wheel 5 of the locking base 4D without being rotatable relative to the drive wheel 5. In the first modification, as illustrated in FIGS. 16 and 17, a portion of the drive wheel 5 facing the first end surface 31 of the winding drum 3 includes a support concave portion 57 recessed in the axial direction of the winding drum 3. A left end portion, which is a part of the ring 55, is inserted into the support concave portion 57. Although not illustrated in FIG. 17, a meshing structure for preventing the relative rotation between the drive wheel 5 and the ring 55 is provided at the support concave portion 57 and the left end portion of the ring 55.

In the first modification, the movement of the ring 55 in the radial direction is restricted by the support concave portion 57, and thus unexpected contact due to the movement of the ring 55 in the radial direction is prevented, such as the contact between an inner circumferential surface of the ring 55 and the stopper member 4C, and such as the contact between the impact energy absorbing wire 4B wound around an outer circumferential surface of the ring 55 and a portion of the winding drum 3 which is located outside of the ring 55 in the radial direction. Therefore, the influence of friction on the impact energy absorption can be easily reduced.

Figure 18:
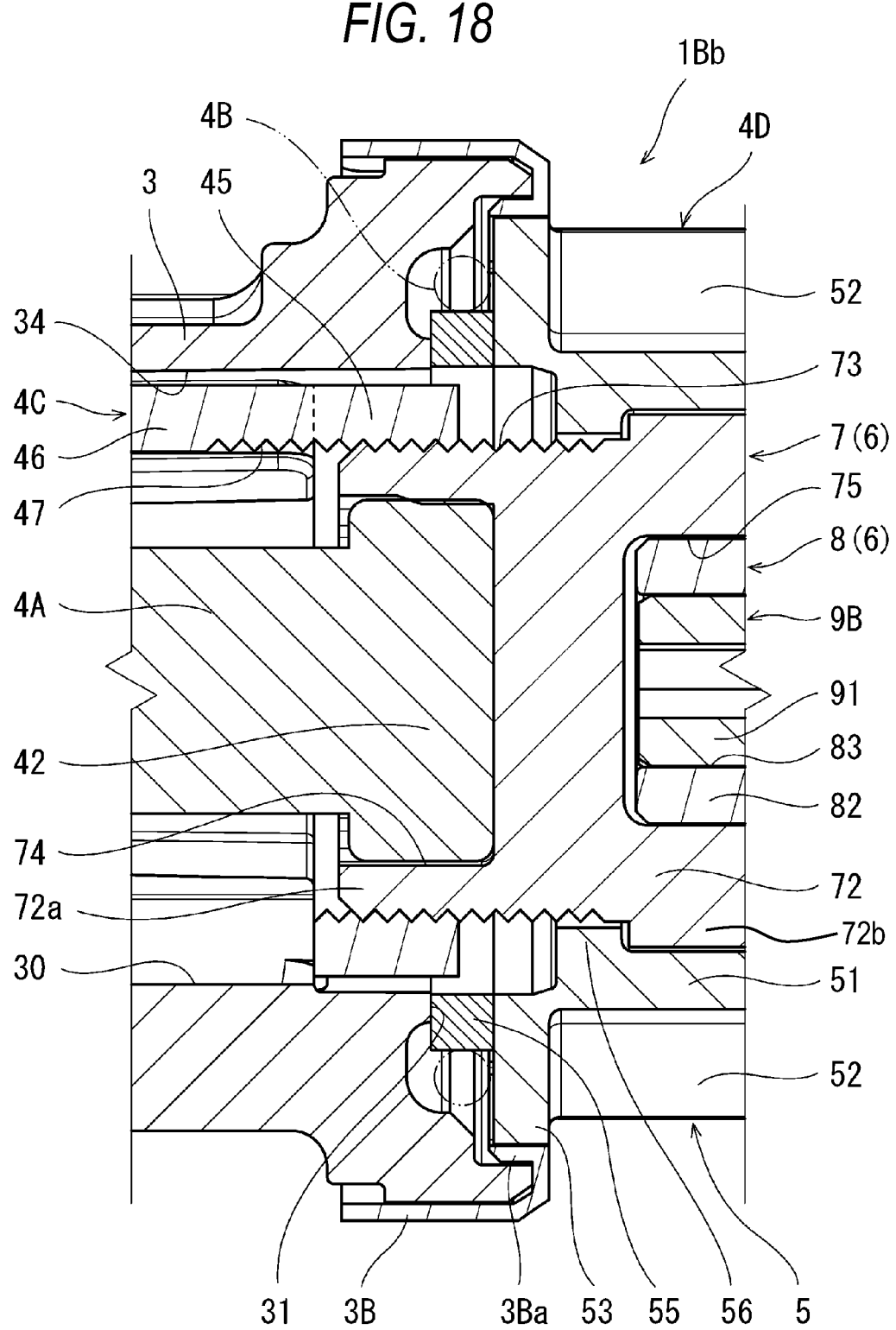
FIG. 18 is a cross-sectional view of a part of a winding drum unit according to a second modification.

Alternatively, as in a winding drum unit 1Bb according to a second modification illustrated in FIG. 18, the ring 55 that is separated from the locking base 4D may be configured to be rotatable relative to the locking base 4D. In this case, there is a possibility that the ring 55 is rotated in the same direction as the winding drum 3 due to the friction between the first end surface 31 of the winding drum 3 and the ring 55 at the time of absorbing impact energy. However, when the impact energy is absorbed, friction occurs between the outer circumferential surface of the ring 55 and the impact energy absorbing wire 4B wound around the outer circumferential surface of the ring 55, and the friction between the outer circumferential surface of the ring 55 and the impact energy absorbing wire 4B increases as the impact energy absorbing wire 4B is wound, and thus the ring 55 is prevented from being rotated in the same direction as the winding drum 3 and is rotatable relative to the winding drum 3. Therefore, even in a case where the ring 55 is rotatable relative to the locking base 4D, the impact energy absorbing wire 4B can absorb the impact energy stably as in the above embodiment. If the ring 55 is rotatable relative to the locking base 4D, a structure for attaching the ring 55 can be easily simplified and a space thereof can be easily saved.

In the winding drum unit 1Bb according to the second modification illustrated in FIG. 18, a portion of the drive wheel 5 facing the first end surface 31 of the winding drum 3 is not provided with the support concave portion 57 (see FIG. 16), and the ring 55 comes into contact with a flat right side surface of the drive wheel 5.

Figure 19:
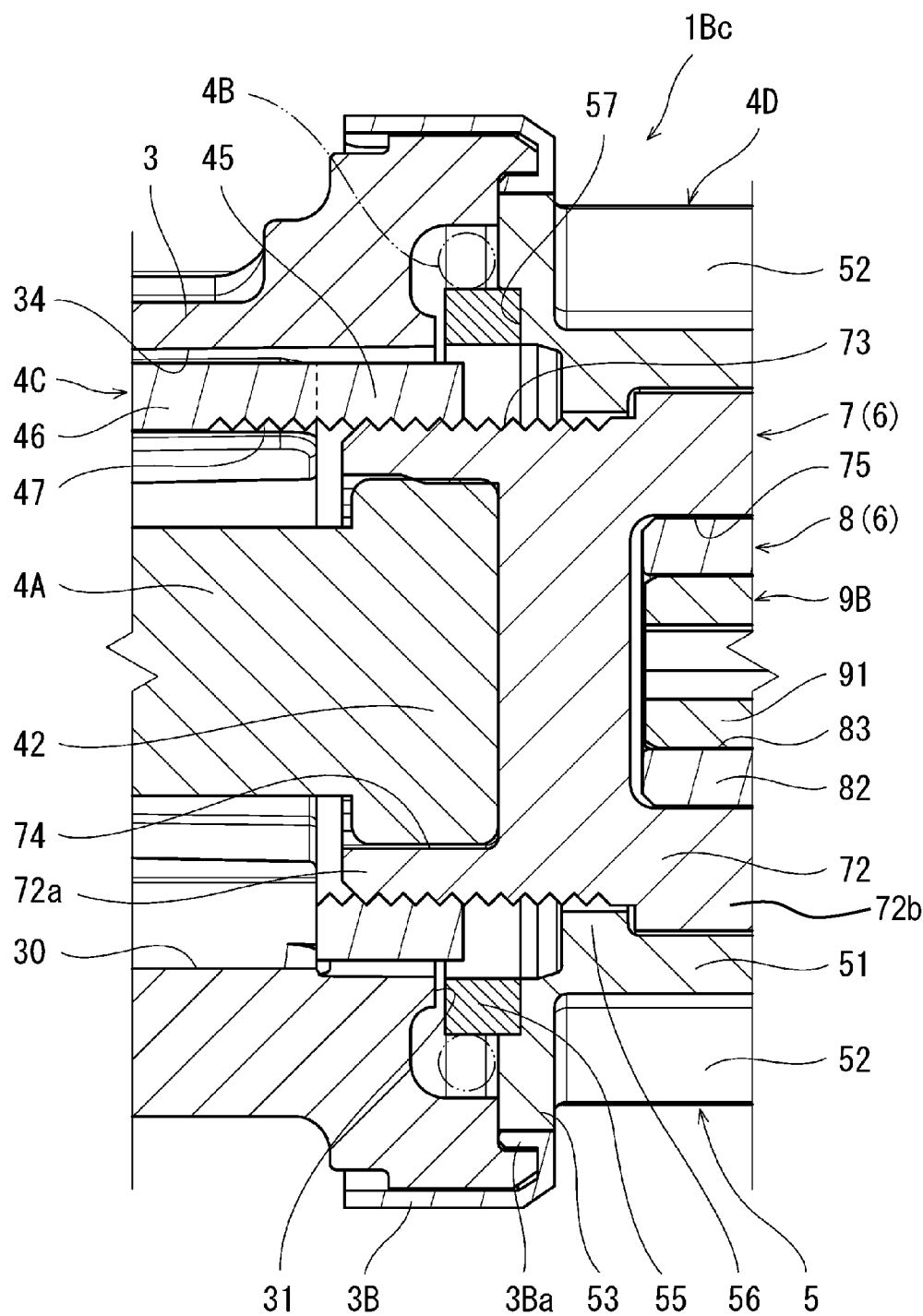
FIG. 19 is a cross-sectional view of a part of a winding drum unit according to a third modification.

As in a winding drum unit 1Bc according to a third modification illustrated in FIG. 19, even in a case where the ring 55 is configured to rotatable relative to the locking base 4D, a portion of the drive wheel 5 facing the first end surface 31 of the winding drum 3 may be provided with the support concave portion 57. That is, in the winding drum unit 1Bc according to the third modification, the support concave portion 57 is provided similar to the first modification, but no meshing structure for preventing the relative rotation between the drive wheel 5 and the ring 55 is provided at the support concave portion 57 and the left end portion of the ring 55. In other words, the shapes of the support concave portion 57 and the left end portion of the ring 55 are exactly as illustrated in FIG. 17. In this case, the movement of the ring 55 in the radial direction is restricted by the support concave portion 57, and thus unexpected contact due to the movement of the ring 55 in the radial direction is prevented, such as the contact between the inner circumferential surface of the ring 55 and the stopper member 4C, and such as the contact between the impact energy absorbing wire 4B wound around the outer circumferential surface of the ring 55 and a portion of the winding drum 3 which is located outside of the ring 55 in the radial direction. Therefore, the influence of friction on the impact energy absorption can be easily reduced.

In the winding drum unit 1Bc according to the third modification illustrated in FIG. 19, the flange 53 of the drive wheel 5 comes into contact with the first end surface 31 of the winding drum 3 in the axial direction of the winding drum 3. A height of the ring 55 in the axial direction of the winding drum 3 is smaller than a space (that is, a distance from the first end surface 31 to a bottom of the support concave portion 57) between the winding drum 3 and the drive wheel 5 at a position at which the ring 55 is present. Therefore, the friction is less likely to occur between the first end surface 31 of the winding drum 3 and the ring 55 at the time of absorbing the impact energy, and the ring 55 is easily rotated relative to the winding drum 3, and thus the influence of friction on the impact energy absorption can be easily reduced.

Figure 20:
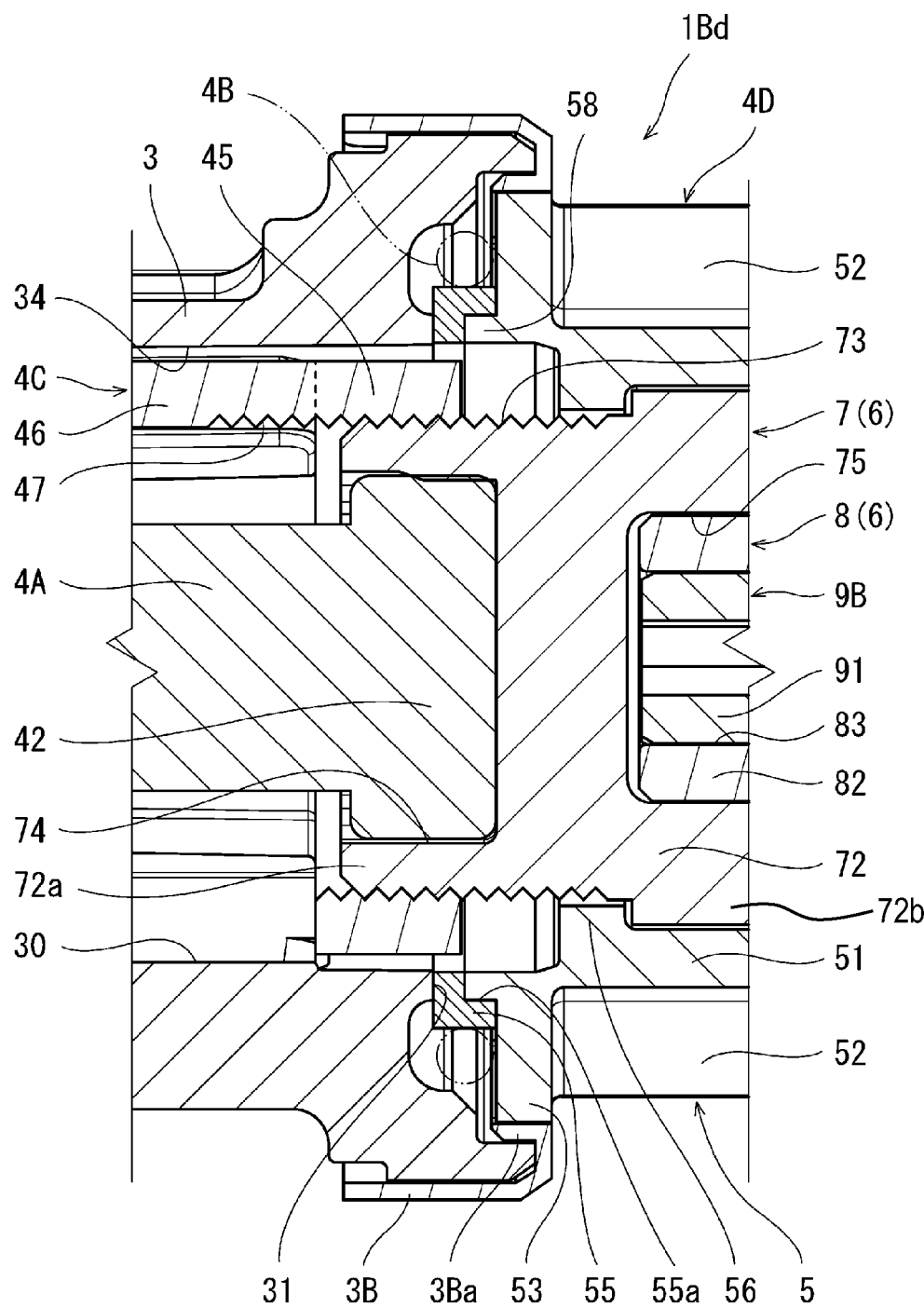
FIG. 20 is a cross-sectional view of a part of a winding drum unit according to a fourth modification.

Alternatively, as in a winding drum unit 1Bd according to a fourth modification illustrated in FIG. 20, in a case where the ring 55 is configured to be rotatable relative to the locking base 4D, a portion of the drive wheel 5 facing the first end surface 31 of the winding drum 3 may be provided with a support convex portion 58 protruding in the axial direction of the winding drum 3. A thickness of the support convex portion 58 is smaller than a thickness of the ring 55 in the radial direction of the winding drum 3. The left end portion of the ring 55 includes a concave portion 55a into which the support convex portion 58 can be inserted, and the support convex portion 58 is inserted inside the ring 55.

According to the configuration, the movement of the ring 55 in the radial direction is restricted by the support convex portion 58, and thus unexpected contact due to the movement of the ring 55 in the radial direction is prevented, such as the contact between an inner circumferential surface of the ring 55 and the stopper member 4C, and such as the contact between the impact energy absorbing wire 4B wound around the outer circumferential surface of the ring 55 and a portion of the winding drum 3 which is located outside of the ring 55 in the radial direction. Therefore, the influence of friction on the impact energy absorption can be easily reduced.

Figure 21:
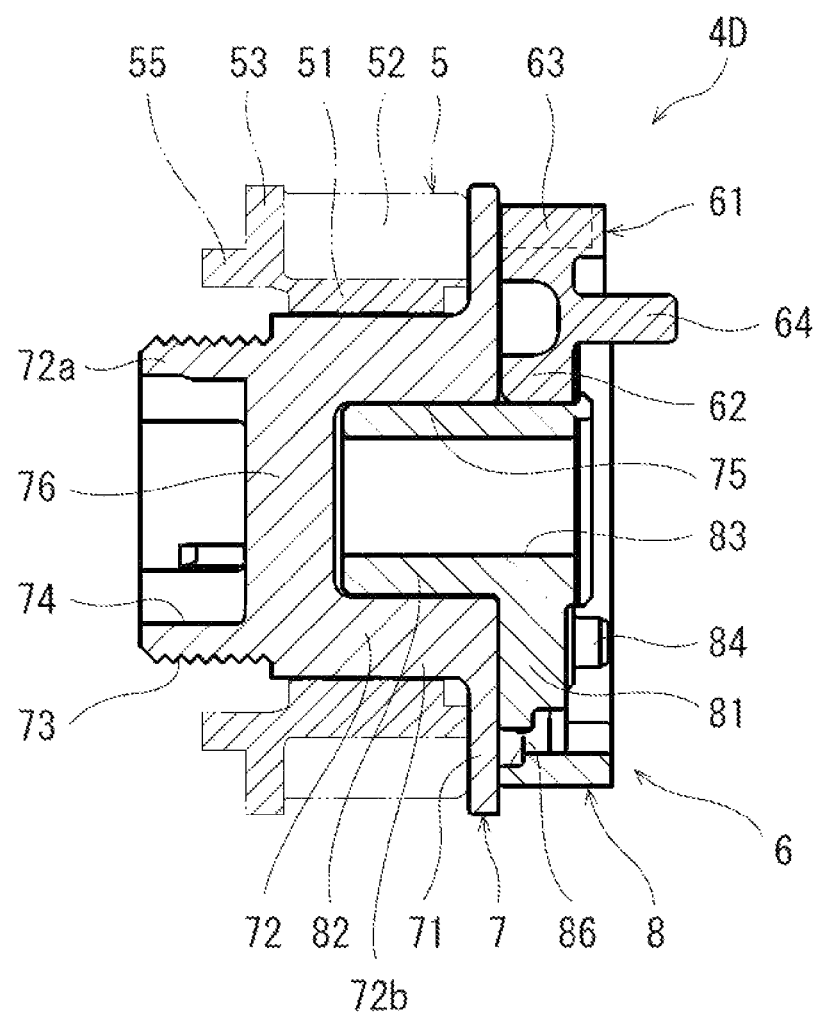
FIG. 21 is a cross-sectional view of a part of a winding drum unit according to a fifth modification.
Figure 22:
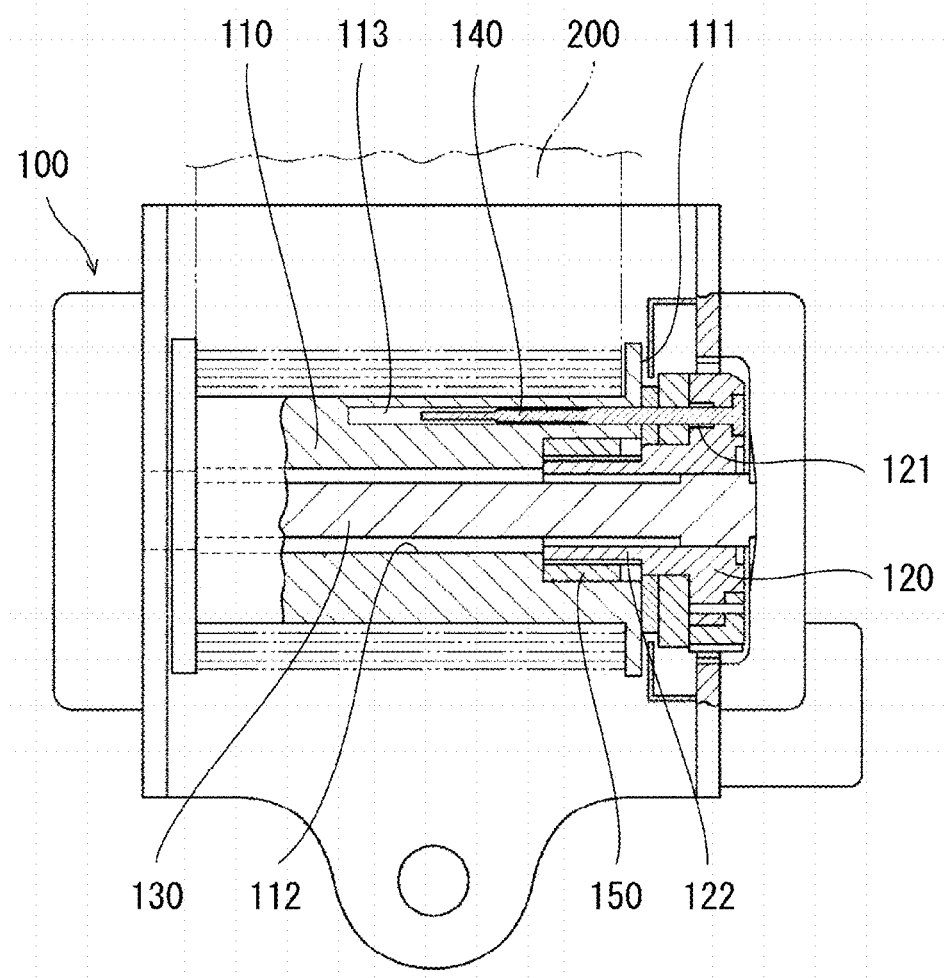
FIG. 22 is a cross-sectional view of a seat belt retractor in the related art.

As show in a fifth modification illustrated in FIG. 21, the proximal end portion 72b of the protruding portion 72 in the first base member 7 may extend to the right side (a side of the shaft portion 72a in which the male screw 73 is provided), without providing an annular flange 56 on the inner peripheral surface of the main body portion 51 of the drive wheel 5. In this case, the stopper member 4C is configured to come into contact with the proximal end portion 72b, instead of the flange 56, and the stopper member 4C moves to the position where the stopper member 4C comes into contact with the proximal end portion 72b. Therefore, the stopper member 4C moves from a position where the stopper member 4C separates from the proximal end portion 72b of the protruding portion 72 to a position where the stopper member 4C comes into contact with the proximal end portion 72b of the protruding portion 72, during the relative rotation of the winding drum 3 and the locking base 4D, thereby restricting the relative rotation of the winding drum 3 and the locking base 4D to a predetermined amount. In other words, the stopper member 4C is prevented from being moved in the axial direction of the winding drum 3 by coming into contact with the proximal end portion 72b of the protruding portion 72. As a result, the stopper member 4C moved inside the ring 55 in the radial direction comes into contact with the proximal end portion 72b, a dimension of the locking base 4D in the axial direction of the winding drum 3 is easily reduced. However, with respect to FIG. 21, the right end of the proximal end portion 72b of the protruding portion 72 and the right edge of the fitting hole of the drive wheel 5 may be aligned, and the stopper member 4C may come into contact with both the proximal end portion 72b of the protruding portion 72 and the drive wheel 5.

The pretensioner 1C and the drive wheel 5 may be omitted. In this case, the first base member 7 may be provided with a flange facing the first end surface 31 of the winding drum 3, and the flange may be provided with the holding portions 54. In addition, in a case where there is no pretensioner 1C, the insertion hole 21a of the first side wall 21 of the housing 2 has the internal teeth 11b formed on a circumferential edge thereof, and the lock member 61 may be engaged with the internal teeth 11b in an emergency of a vehicle.

Furthermore, the locking base 4D may be formed with external teeth, and a lock member that is engaged with the external teeth may be provided on the first side wall 21 of the housing 2.

CONCLUSION

As a first aspect, the present disclosure provides a seat belt retractor including:
a housing including a pair of side walls facing each other;
a winding drum configured to wind up a webbing, the winding drum being housed between the pair of side walls so as to be rotatable in a winding direction and a pull-out direction of the webbing, the winding drum having a center hole opened at least in a first end surface;
a locking base disposed to face the first end surface of the winding drum, the locking base being prevented from being rotated in the pull-out direction, in an emergency of a vehicle, a male screw being formed on an outer circumferential surface of a shaft portion, of the locking base, coaxial with the winding drum;
an impact energy absorbing member including one end side coupled to the winding drum and the other end side coupled to the locking base, the impact energy absorbing member connecting the winding drum and the locking base so as to be integrally rotatable in a normal state, and the impact energy absorbing member being configured to be plastically deformed in a case where a pull-out force of the webbing exceeds a predetermined value in a state where the locking base is prevented from being rotated in the pull-out direction, so as to absorb impact energy while allowing relative rotation between the winding drum and the locking base;

an impact energy absorbing wire housed in a slot provided in the winding drum so as to form an opening in the first end surface of the winding drum, a head portion of the impact energy absorbing wire that protrudes from the opening of the slot being attached to the locking base, the impact energy absorbing wire being configured to be pulled out from the opening while being plastically deformed in a case where the winding drum and the locking base are relatively rotated, so as to absorb the impact energy;

a ring provided integrally with or separately from the locking base, the ring being configured to be coaxially rotatable relative to the winding drum, the impact energy absorbing wire pulled out from the opening being wound around an outer circumference of the ring; and a stopper member being held in the center hole without being rotatable relative to the winding drum and so as to be movable in an axial direction of the winding drum, the stopper member being screwed onto the male screw of the locking base, and the stopper member being configured to define an allowable amount of relative rotation between the winding drum and the locking base in a case where the impact energy absorbing member absorbs the impact energy, in which the stopper member may configured to be movable while being located radially inside the ring.

According to the above configuration, the ring around which the impact energy absorbing wire is wound is configured to be rotatable relative to the winding drum, and thus the impact energy absorbing wire can absorb the impact energy stably. In addition, the stopper member is configured to be movable while being located radially inside the ring, and thus a dimension of the locking base in the axial direction of the winding drum can be reduced. Therefore, the seat belt retractor can be reduced in size in the axial direction of the winding drum.

As a second aspect, according to the first aspect, the locking base includes an annular protrusion protruding toward the first end surface of the winding drum, and the ring may be the annular protrusion. According to the configuration, the ring is integrated with the locking base, and thus the number of components can be reduced.

As a third aspect, according to the first aspect, the ring may be separated from the locking base, the ring being attached to the locking base without being rotatable relative to the locking base. According to the configuration, the ring is separated from the locking base, and thus a shape and a material of the ring are easily optimized. Therefore, a cost and a weight of the seat belt retractor can be easily reduced.

As a fourth aspect, according to the first aspect, the ring may be separated from the locking base, the ring being configured to be rotatable relative to the locking base. According to the configuration, the ring is separated from the locking base, and thus a shape and a material of the ring are easily optimized. Therefore, a cost and a weight of the seat belt retractor can be easily reduced. The ring is configured to be rotatable relative to the locking base, and thus a structure for attaching the ring can be easily simplified and a space thereof can be easily saved.

As a fifth aspect, according to the fourth aspect, the locking base may include a support concave portion at a portion facing the first end surface of the winding drum, the support concave portion being recessed in the axial direction of the winding drum, and a part of the ring may be inserted into the support concave portion. According to the configuration, the movement of the ring in the radial direction is restricted by the support concave portion, and thus unexpected contact due to the movement of the ring in the radial direction is prevented, such as the contact between an inner circumferential surface of the ring and the stopper member, and such as the contact between the impact energy absorbing wire wound around an outer circumferential surface of the ring and a portion of the winding drum which is located outside of the ring in the radial direction. Therefore, the influence of friction on the impact energy absorption can be easily reduced.

As a sixth aspect, according to the fourth aspect, the locking base may include a support convex portion at a portion facing the first end surface of the winding drum, the support convex portion protruding in the axial direction of the winding drum, and the support convex portion may be inserted inside the ring. According to the configuration, the movement of the ring in the radial direction is restricted by the support convex portion, and thus unexpected contact due to the movement of the ring in the radial direction is prevented, such as the contact between the inner circumferential surface of the ring and the stopper member, and such as the contact between the impact energy absorbing wire wound around the outer circumferential surface of the ring and a portion of the winding drum which is located outside of the ring in the radial direction. Therefore, the influence of friction on the impact energy absorption can be easily reduced.

As a seventh aspect, according to any one of the first to sixth aspects, at least a part of the male screw of the shaft portion may be located radially inside the ring. According to the configuration, the shaft portion of the locking base is easily shortened.

As an eighth aspect, according to any one of the first to seventh aspects, the locking base may include a drive wheel facing the first end surface of the winding drum, the seat belt retractor may further include a pretensioner configured to rotate the drive wheel in the winding direction of the winding drum in the emergency of the vehicle to rotate the winding drum in the winding direction via the locking base and the impact energy absorbing member, and the ring may be provided between the first end surface of the winding drum and the drive wheel. According to the configuration, the dimension of the locking base in the axial direction of the winding drum is easily reduced in the seat belt retractor including the pretensioner.

As a ninth aspect, according to the eighth aspect, the stopper member may be prevented from being moved in the axial direction of the winding drum by coming into contact with the drive wheel. According to the configuration, the stopper member that is movable while being located radially inside the ring comes into contact with the drive wheel, and thus the dimension of the locking base in the axial direction of the winding drum is easily reduced.

As a tenth aspect, according to the eighth aspect or ninth aspect, the locking base may include a protruding portion, the protruding portion protruding toward the winding drum from a portion of the locking base positioned on an opposite side of the winding drum with respect to the drive wheel, the protruding portion being formed with the shaft portion in a distal end side of the protruding portion, the protruding portion includes, at a proximal side of the male screw, a proximal portion protruding radially outward more than the male screw, and the stopper member is prevented from being moved in the axial direction of the winding drum by coming into contact with the proximal portion. According to the configuration, the stopper member that is movable while being located radially inside the ring comes into contact with the proximal end portion of the protruding portion, and thus the dimension of the locking base in the axial direction of the winding drum is easily reduced.

What is claimed is:

1. A seat belt retractor comprising:
   a housing including a pair of side walls facing each other;
   a winding drum configured to wind up a webbing, the winding drum being housed between the pair of side walls so as to be rotatable in a winding direction and a pull-out direction of the webbing, the winding drum having a center hole opened at least in a first end surface;
   a locking base disposed to face the first end surface of the winding drum, the locking base being prevented from being rotated in the pull-out direction, in an emergency of a vehicle, a male screw being formed on an outer circumferential surface of a shaft portion, of the locking base, coaxial with the winding drum;
   an impact energy absorbing member including one end side coupled to the winding drum and the other end side coupled to the locking base, the impact energy absorbing member connecting the winding drum and the locking base so as to be integrally rotatable in a normal state, and the impact energy absorbing member being configured to be plastically deformed in a case where a pull-out force of the webbing exceeds a predetermined value in a state where the locking base is prevented from being rotated in the pull-out direction, so as to absorb impact energy while allowing relative rotation between the winding drum and the locking base;
   an impact energy absorbing wire housed in a slot provided in the winding drum so as to form an opening in the first end surface of the winding drum, a head portion of the impact energy absorbing wire that protrudes from the opening of the slot being attached to the locking base, the impact energy absorbing wire being configure to be pulled out from the opening while being plastically deformed in a case where the winding drum and the locking base are relatively rotated, so as to absorb the impact energy;
   a ring provided integrally with or separately from the locking base, the ring being configured to be coaxially rotatable relative to the winding drum, the impact energy absorbing wire pulled out from the opening being wound around an outer circumference of the ring; and
   a stopper member being held in the center hole without being rotatable relative to the winding drum and so as to be movable in an axial direction of the winding drum, the stopper member being screwed onto the male screw of the locking base, and the stopper member being configured to define an allowable amount of relative rotation between the winding drum and the locking base in a case where the impact energy absorbing member absorbs the impact energy,
   wherein the stopper member is configured to be movable while being located radially inside the ring.

2. The seat belt retractor according to claim 1, wherein the locking base includes an annular protrusion protruding toward the first end surface of the winding drum, and
   the ring is the annular protrusion.

3. The seat belt retractor according to claim 1, wherein the ring is separated from the locking base, the ring being attached to the locking base without being rotatable relative to the locking base.

4. The seat belt retractor according to claim 1, wherein the ring is separated from the locking base, the ring being configured to be rotatable relative to the locking base.

5. The seat belt retractor according to claim 4, wherein the locking base includes a support concave portion at a portion facing the first end surface of the winding drum, the support concave portion being recessed in the axial direction of the winding drum, and
   a part of the ring is inserted into the support concave portion.

6. The seat belt retractor according to claim 4, wherein the locking base includes a support convex portion at a portion facing the first end surface of the winding drum, the support convex portion protruding in the axial direction of the winding drum, and
   the support convex portion is inserted inside the ring.

7. The seat belt retractor according to claim 1, wherein at least a part of the male screw of the shaft portion is located radially inside the ring.

8. The seat belt retractor according to claim 1, wherein the locking base includes a drive wheel facing the first end surface of the winding drum,
   the seat belt retractor further includes a pretensioner configured to rotate the drive wheel in the winding direction of the winding drum, in the emergency of the vehicle, to rotate the winding drum in the winding direction via the locking base and the impact energy absorbing member, and
   the ring is provided between the first end surface of the winding drum and the drive wheel.

9. The seat belt retractor according to claim 8, wherein the stopper member is prevented from being moved in the axial direction of the winding drum by coming into contact with the drive wheel.

10. The seat belt retractor according to claim 8, wherein the locking base includes a protruding portion, the protruding portion protruding toward the winding drum from a portion of the locking base positioned on an opposite side of the winding drum with respect to the drive wheel, the protruding portion being formed with the shaft portion in a distal end side of the protruding portion,
    the protruding portion includes, at a proximal side of the male screw, a proximal portion protruding radially outward more than the male screw, and
    the stopper member is prevented from being moved in the axial direction of the winding drum by coming into contact with the proximal portion.

11. The seat belt retractor according to claim 9, wherein the locking base includes a protruding portion, the protruding portion protruding toward the winding drum from a portion of the locking base positioned on an opposite side of the winding drum with respect to the drive wheel, the protruding portion being formed with the shaft portion in a distal end side of the protruding portion,
    the protruding portion includes, at a proximal side of the male screw, a proximal portion protruding radially outward more than the male screw, and
    the stopper member is prevented from being moved in the axial direction of the winding drum by coming into contact with the proximal portion.

* * * * *